US012575497B2

(12) United States Patent
Modak et al.

(10) Patent No.: US 12,575,497 B2
(45) Date of Patent: Mar. 17, 2026

(54) AUTOMATED LOCKOUT SYSTEM FOR HEADER

(71) Applicant: DEERE & COMPANY, Moline, IL (US)

(72) Inventors: Shreyas P. Modak, Thane (IN); Alex A. Brimeyer, Bettendorf, IA (US); Shally Jarquin Cadena, Monterrey (MX)

(73) Assignee: DEERE & COMPANY, Moline, IL (US)

( * ) Notice: Subject to any disclaimer, the term of this patent is extended or adjusted under 35 U.S.C. 154(b) by 845 days.

(21) Appl. No.: 17/447,083

(22) Filed: Sep. 8, 2021

(65) Prior Publication Data

US 2023/0076930 A1 Mar. 9, 2023

(51) Int. Cl.
*A01D 41/14* (2006.01)
*A01D 34/28* (2006.01)

(52) U.S. Cl.
CPC ........... *A01D 41/141* (2013.01); *A01D 34/28* (2013.01); *A01D 41/145* (2013.01)

(58) Field of Classification Search
CPC .... A01D 41/141; A01D 41/145; A01D 34/28; A01D 34/04; A01D 69/03
See application file for complete search history.

(56) References Cited

U.S. PATENT DOCUMENTS 1,451,140 A 4/1923 Brown
2,513,703 A 7/1950 Annis 2,863,273 A * 12/1958 Turner ................. A01D 34/246
56/11.9
2,915,870 A 12/1959 Hume
3,349,549 A 10/1967 Van Der Lely
(Continued)

FOREIGN PATENT DOCUMENTS

CA 3026913 A1 10/2019
EP 1993345 B1 1/2018
(Continued)

OTHER PUBLICATIONS

Case IH 3162—Draper Header (11/11-) Parts (messicks.com), pp. 1-5, [online], [retrieved on Apr. 6, 2020]. Retrieved from the Internet <URL: https://www.messicks.com/commoncatalog?vendor= cas&modelId=142078&sectionId=300671&diagramId=1336949>.
(Continued)

*Primary Examiner* — Joseph M Rocca
*Assistant Examiner* — Julia C Tran

(57) ABSTRACT

Systems and methods for automated lockout systems for moving a cutterbar between a rigid configuration and a flexible configuration in response to actuation of one or more gauge wheels. In some implementations, a cutterbar is movable into a rigid configuration in response to extension of a gauge wheel. In some implementations, the cutterbar is movable into a flexible configuration in response to retraction of a gauge wheel. In some implementations, movement of a cutterbar into a rigid configuration occurs simultaneously with extension of a gauge wheel. In some implementations, movement of the cutterbar into a flexible configuration occurs simultaneously with retraction of a gauge wheel. In some implementations, movement of a gauge wheel and a cutter bar is performed in response to fluidic pressure.

19 Claims, 12 Drawing Sheets

(56) References Cited

U.S. PATENT DOCUMENTS

| | | | |
|---|---|---|---|
| 3,517,491 A * | 6/1970 | Harer | A01D 41/14 |
| | | | 56/DIG. 1 |
| 3,577,713 A * | 5/1971 | McCarty | A01D 34/246 |
| | | | 172/466 |
| 3,599,405 A * | 8/1971 | Hurlburt | A01D 43/107 |
| | | | 56/14.4 |
| 3,698,164 A | 10/1972 | Boone et al. | |
| 3,747,311 A | 7/1973 | De Coene et al. | |
| 3,797,207 A * | 3/1974 | Sawyer | A01D 43/107 |
| | | | 56/1 |
| 3,808,784 A | 5/1974 | Krukow et al. | |
| 3,828,532 A * | 8/1974 | Fickle | A01D 43/107 |
| | | | 56/14.4 |
| 3,919,831 A * | 11/1975 | Halls | A01D 67/005 |
| | | | 56/228 |
| 4,124,970 A | 11/1978 | Bernhardt | |
| 4,127,981 A * | 12/1978 | Parrish | A01D 43/105 |
| | | | 56/14.4 |
| 4,204,383 A | 5/1980 | Milliken, Jr. | |
| 4,332,126 A | 6/1982 | Van Auwelaer et al. | |
| 4,573,308 A | 3/1986 | Ehrecke et al. | |
| 4,599,852 A | 7/1986 | Kerber et al. | |
| 4,843,804 A * | 7/1989 | Wellman | A01D 43/107 |
| | | | 56/15.8 |
| 4,845,931 A | 7/1989 | Bruner et al. | |
| 6,318,477 B1 | 11/2001 | Bettin | |
| 6,675,568 B2 | 1/2004 | Patterson et al. | |
| 7,520,115 B2 | 4/2009 | Coers et al. | |
| 7,549,243 B1 | 6/2009 | Gilles | |
| 7,640,720 B1 | 1/2010 | Lovett et al. | |
| 7,661,251 B1 | 2/2010 | Sloan et al. | |
| 7,805,921 B2 | 10/2010 | Coers et al. | |
| 7,877,976 B2 | 2/2011 | Honas et al. | |
| 7,930,871 B1 | 4/2011 | Figgins | |
| 7,937,919 B2 | 5/2011 | Coers et al. | |
| 7,987,656 B2 | 8/2011 | Ehrhart et al. | |
| 7,992,374 B1 | 8/2011 | Bich et al. | |
| 8,245,489 B2 | 8/2012 | Talbot | |
| 8,393,135 B2 | 3/2013 | Honas et al. | |
| 8,534,037 B2 | 9/2013 | Sauerwein et al. | |
| 8,601,779 B1 | 12/2013 | Figgins et al. | |
| 9,148,999 B2 | 10/2015 | Fuechtling | |
| 9,750,185 B2 | 9/2017 | Fay, II | |
| 9,775,291 B2 | 10/2017 | Neudorf | |
| 10,433,486 B2 | 10/2019 | Vandeven et al. | |
| 10,462,968 B2 | 11/2019 | Shearer | |
| 10,517,215 B2 | 12/2019 | Brimeyer et al. | |
| 10,542,669 B2 | 1/2020 | Vandeven et al. | |
| 11,191,212 B2 | 12/2021 | Brimeyer et al. | |
| 11,246,259 B2 | 2/2022 | Yanke et al. | |
| 11,382,262 B2 | 7/2022 | Thomas et al. | |
| 11,559,000 B2 | 1/2023 | Brimeyer | |
| 11,778,943 B2 | 10/2023 | Brimeyer | |
| 2003/0010010 A1 | 1/2003 | Buermann | |
| 2003/0074876 A1 | 4/2003 | Patterson et al. | |
| 2006/0242935 A1* | 11/2006 | Rayfield | A01D 41/141 |
| | | | 56/10.2 E |
| 2007/0193243 A1 | 8/2007 | Schmidt et al. | |
| 2007/0204585 A1* | 9/2007 | Lovett | A01D 61/002 |
| | | | 56/15.8 |
| 2008/0078155 A1 | 4/2008 | Coers et al. | |
| 2008/0271426 A1 | 11/2008 | Lohrentz et al. | |
| 2009/0249760 A1 | 10/2009 | Sauerwein et al. | |
| 2009/0277147 A1 | 11/2009 | Honas et al. | |
| 2009/0293441 A1 | 12/2009 | Sauerwein | |
| 2010/0000191 A1 | 1/2010 | Ehrhart et al. | |
| 2010/0043368 A1* | 2/2010 | Sloan | A01D 41/141 |
| | | | 56/10.2 E |
| 2010/0083629 A1 | 4/2010 | Klotzbach et al. | |
| 2010/0281837 A1* | 11/2010 | Talbot | A01D 41/141 |
| | | | 56/10.2 E |
| 2011/0252761 A1 | 10/2011 | Bich et al. | |
| 2014/0041351 A1 | 2/2014 | Bollin et al. | |
| 2014/0075912 A1 | 3/2014 | Fuechtling | |

| | | | |
|---|---|---|---|
| 2014/0076153 A1* | 3/2014 | Brockmann | A01B 63/10 |
| | | | 91/34 |
| 2014/0090345 A1 | 4/2014 | Honas et al. | |
| 2014/0318098 A1* | 10/2014 | Fay, II | A01D 34/001 |
| | | | 56/229 |
| 2015/0007545 A1 | 1/2015 | Honas et al. | |
| 2015/0271999 A1 | 10/2015 | Enns et al. | |
| 2015/0319920 A1 | 11/2015 | Joyce | |
| 2018/0153102 A1 | 6/2018 | Dunn et al. | |
| 2019/0029174 A1* | 1/2019 | Talbot | A01D 41/148 |
| 2019/0029175 A1 | 1/2019 | Talbot et al. | |
| 2019/0029176 A1 | 1/2019 | Yanke et al. | |
| 2019/0183049 A1 | 6/2019 | Cook et al. | |
| 2019/0200523 A1 | 7/2019 | Fay, II et al. | |
| 2019/0230858 A1* | 8/2019 | Shearer | A01D 41/141 |
| 2019/0297775 A1 | 10/2019 | Fuechtling et al. | |
| 2020/0053963 A1 | 2/2020 | Vandeven et al. | |
| 2020/0337227 A1 | 10/2020 | Yanke et al. | |
| 2020/0337239 A1 | 10/2020 | Brimeyer et al. | |
| 2020/0337241 A1 | 10/2020 | Brimeyer et al. | |
| 2020/0344950 A1 | 11/2020 | Brimeyer et al. | |
| 2021/0123461 A1 | 4/2021 | Morrison et al. | |
| 2021/0185875 A1 | 6/2021 | Noll et al. | |
| 2021/0185878 A1 | 6/2021 | Hunt | |
| 2021/0185908 A1 | 6/2021 | Hunt | |
| 2021/0185915 A1 | 6/2021 | Hunt | |
| 2021/0212248 A1 | 7/2021 | Kong et al. | |
| 2021/0212254 A1 | 7/2021 | Thomas et al. | |
| 2021/0274706 A1 | 9/2021 | Cook | |
| 2021/0307233 A1 | 10/2021 | Lyons et al. | |
| 2021/0368675 A1 | 12/2021 | Brimeyer | |
| 2021/0392816 A1 | 12/2021 | Cook | |
| 2022/0007578 A1 | 1/2022 | Trowbridge et al. | |
| 2022/0030767 A1 | 2/2022 | Cook | |
| 2022/0338416 A1 | 10/2022 | Racchella et al. | |
| 2023/0022413 A1 | 1/2023 | Modak et al. | |
| 2023/0023341 A1 | 1/2023 | Modak et al. | |
| 2023/0024403 A1 | 1/2023 | Modak et al. | |
| 2023/0076926 A1 | 3/2023 | Füchtling et al. | |
| 2023/0076930 A1 | 3/2023 | Modak et al. | |
| 2023/0284561 A1* | 9/2023 | Trowbridge | A01D 41/141 |
| 2023/0380347 A1 | 11/2023 | Trowbridge | |
| 2023/0413709 A1 | 12/2023 | Honey et al. | |
| 2024/0114826 A1 | 4/2024 | Modak et al. | |

FOREIGN PATENT DOCUMENTS

| | | | |
|---|---|---|---|
| EP | 3281508 A1 | 2/2018 | |
| EP | 3498071 A1 | 6/2019 | |
| EP | 3942918 A1 | 1/2022 | |
| EP | 3723469 B1 | 3/2024 | |
| RU | 2480979 C2 | 5/2013 | |
| WO | WO 2020101855 A1 | 5/2020 | |
| WO | WO 2020101859 A1 | 5/2020 | |

OTHER PUBLICATIONS

Case-IH-3152-3162-Draper-Header-Productivity-Guide-GH-2073-20, copyright 2020, pp. 1-24.

Geringhoff, TruFlex (Razor) Draper Head, pp. 1-16.

Geringhoff, TruFlex Razor Draper Head, Operating Manual, pp. 1-241 (relevant pages are pp. 159-161).

John Deere, 600FD-Flexible Draper Active Header Height Control, Quick Reference Guide, pp. 1-6.

3152 3162 Case IH TerraFlex Draper Header Set Up & Operation [online], Jan. 10, 2014 [retrieved on Oct. 18, 2024]. Retrieved from YouTube <URl: https://www.youtube.com/watch?v=Ws7RQGnvWtA>.

Claas Convio Flexible Draper [online], Jun. 18, 2021 [retrieved on Oct. 18, 2024]. Retrieved from YouTube <URL: https://www.youtube.com/watch?v=kA01ZGbZIXI>.

Deere 700FD Flexible Draper Active Header Height Control (AHHC) Quick Reference Guide, 2020, pp. 1-6 (6 pages).

Geringhoff TruFlex Razor Draper Head Operating Manual, 2017, pp. 1, 159-170, and 241 (14 pages).

Honey Bee Manufacturing 2020 Grain/Rice Belt Header Operator Manual, 2020, pp. 1-5, 57-63 (12 pages).

(56)         References Cited

OTHER PUBLICATIONS

MacDon FD1 Series FlexDraper Header for Combines with FM100 Float Module Parts Catalog, 2019, pp. i-xvi, pp. 1-366, (410 pages).

MacDon FD2 Series FlexDraper Header with FM200 Float Module Operator's Manual, 2022, pp. 1, 2, 52-60, and 98-104. (18 pages).

Extended European Search Report and Written Opinion issued in European Patent Application No. 25163570.2 dated Sep. 10, 2025, in 09 pages.

Extended European Search Report and Written Opinion issued in European Patent Application No. 25163571.0 dated Sep. 16, 2025, in 11 pages.

Extended European Search Report and Written Opinion issued in European Patent Application No. 25163572.8 dated Sep. 8, 2025, in 10 pages.

Extended European Search Report and Written Opinion issued in European Patent Application No. 25163573.6 dated Sep. 8, 2025, in 09 pages.

Extended European Search Report and Written Opinion issued in European Patent Application No. 25163574.4 dated Sep. 26, 2025, in 13 pages.

* cited by examiner

AUTOMATED LOCKOUT SYSTEM FOR HEADER

FIELD OF THE DISCLOSURE

The present disclosure relates generally to an agricultural header and, particularly, to selectively configuring a cutterbar of an agricultural header.

BACKGROUND OF THE DISCLOSURE

Agricultural harvesters use a variety of implements to gather crops. A "draper" or "draper header" is one such type of these implements. Conventional draper headers use conveyors with endless belts to carry cut crop material from leading-edge knives to center regions of the headers. From there, the cut crop material is conveyed into the harvesters. Once in the harvester, the cut crop material is further processed by separating grain from unwanted crop material (typically called "material other than grain" or "MOG").

SUMMARY OF THE DISCLOSURE

A first aspect of the present disclosure is directed to a system for automatically configuring a cutterbar of an agricultural header. The system may include a gauge wheel moveable between an extended position and a retracted position; and a cutterbar movable between a flexible configuration and a rigid configuration. The cutterbar may be movable into the rigid configuration in response to a pressurized fluid used to move the gauge wheel into the extended position, or the cutterbar may be movable into the flexible configuration in response to the pressurized fluid used to move the gauge wheel into the retracted position.

A second aspect of the present disclosure is directed to a method of automatically configuring a cutterbar of an agricultural header. The method may include pressurizing a fluid and one of moving a gauge wheel into an extended position and simultaneously moving a cutterbar into a rigid configuration and moving the gauge wheel into a retracted position and simultaneously moving the cutterbar into a flexible configuration in response to the pressurized fluid.

The various aspects may include one or more of the following features. The pressurized fluid may cause simultaneous extension of the gauge wheels and movement of the cutterbar into the rigid configuration. The pressurized fluid may cause simultaneous retraction of the gauge wheels and movement of the cutterbar into the flexible configuration. A float arm may be engaged with the cutterbar, and the float arm may be moveable between a first position in which the cutterbar and float arm are in the flexible configuration and a second position in which the cutterbar and the float arm are in the rigid configuration. A first actuator may be coupled to the gauge wheel and may be actuatable in response to the pressurized fluid to move the gauge wheel between the extended position and the retracted position. A second actuator may be coupled to the cutterbar. The second actuator may be actuatable in response to the pressurized fluid to move the cutterbar between the flexible configuration and the rigid configuration. The first actuator may be a first hydraulic cylinder, and the second actuator may be a second hydraulic cylinder. A hydraulic circuit may be in fluid communication with the first hydraulic cylinder and the second hydraulic cylinder. The hydraulic circuit may include a first line extending to a first end of the first hydraulic cylinder; a second line extending to a second end of the first hydraulic cylinder; a third line extending from the first line to a first end of the second hydraulic cylinder; and a valve disposed in the third line and moveable in response to the pressurized fluid in the second line. The first hydraulic cylinder and the second hydraulic cylinder may be extended in response to introduction of the pressurized fluid into the first line. The gauge wheel may be moved into the extended position in response to extension of the first hydraulic cylinder, and the cutterbar may be moved into the rigid configuration in response to extension of the second hydraulic cylinder. The first hydraulic cylinder may be retracted in response the pressurized fluid in the second line. The valve may be actuated in response to the pressurized fluid in the second line, and the second hydraulic cylinder may be retracted in response to actuation of the valve. The valve may be a pilot pressure valve, and a pressure pilot line may extend from the second line to the pilot pressure valve. The pressure pilot line may communicate pressure of the pressurized fluid to cause actuation of the pilot pressure valve when the pressurized fluid reaches a selected pressure. A pressure sensor may measure the fluid pressure within the second line, and the pressure sensor may send a signal to the valve to actuate the valve when the fluid pressure sensed by the sensor reaches a selected pressure. The second hydraulic cylinder may be a single acting hydraulic cylinder. The second hydraulic cylinder may be a double acting hydraulic cylinder.

The various aspects may include one or more of the following features. Moving a gauge wheel into an extended position and simultaneously moving a cutterbar into a rigid configuration in response to the pressurize fluid may include actuating a first hydraulic cylinder to move the gauge wheel into the extended position in response to the pressurized fluid and simultaneously actuating a second hydraulic cylinder to move the cutterbar into the rigid configuration in response to the pressurized fluid. Moving the gauge wheel into a retracted position while simultaneously moving the cutterbar into a flexible configuration in response to a pressurized fluid may include actuating a first hydraulic cylinder to move the gauge wheel into the retracted position in response to the pressurized fluid and actuating a valve when the pressurized fluid reaches a selected pressure. Actuation of the valve causes actuation of a second hydraulic cylinder to move the cutterbar into the flexible configuration. The valve may be a pilot pressure valve. Actuating a valve when the pressurized fluid reaches a selected pressure may include transmitting the pressurized fluid to the pilot pressure valve via a pilot pressure line and actuating the pilot pressure valve with the pressurized fluid when the pressurized fluid reaches the selected pressure. Actuating a valve when the pressurized fluid reaches a selected pressure may include sensing a pressure of the pressurized fluid with a pressure sensor and actuating the valve when the sensed pressure of the pressurized fluid reaches the selected pressure.

Other features and aspects will become apparent by consideration of the detailed description and accompanying drawings.

BRIEF DESCRIPTION OF THE DRAWINGS

The detailed description of the drawings refers to the accompanying figures in which.

DETAILED DESCRIPTION

Figure 1:
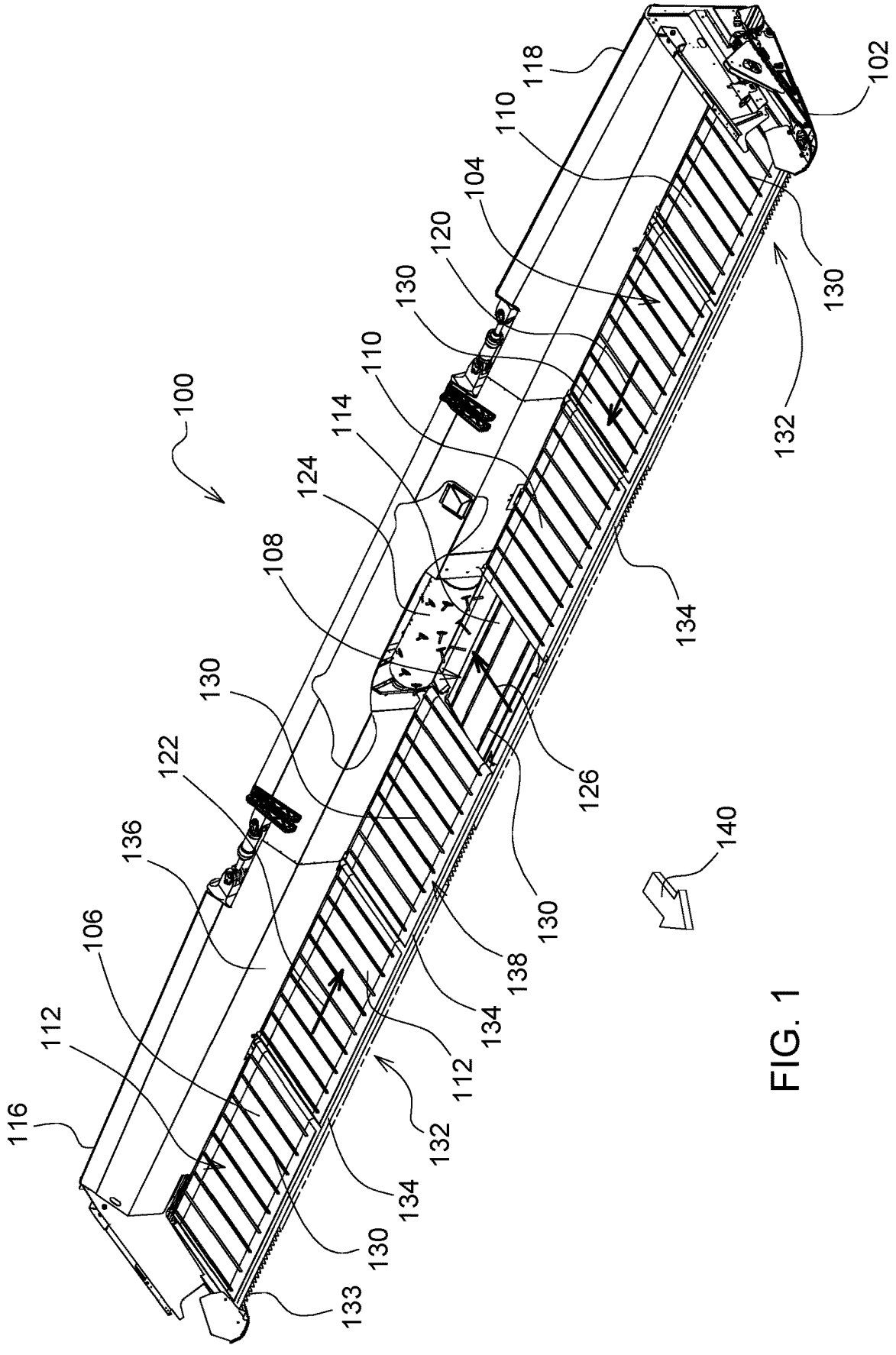
FIG. 1 is an oblique view of an example draper header, according to some implementations of the present disclosure.

For the purposes of promoting an understanding of the principles of the present disclosure, reference will now be made to the implementations illustrated in the drawings, and specific language will be used to describe the same. It will nevertheless be understood that no limitation of the scope of the disclosure is intended. Any alterations and further modifications to the described devices, systems, or methods and any further application of the principles of the present disclosure are fully contemplated as would normally occur to one skilled in the art to which the disclosure relates. In particular, it is fully contemplated that the features, components, and/or steps described with respect to one implementation may be combined with the features, components, and/or steps described with respect to other implementations of the present disclosure.

The present disclosure is directed to agricultural implements and, particularly, to draper headers that include automated lockout systems that are movable between a flexible configuration and a rigid configuration. Although various examples are provided in the context of draper headers, the scope of the present disclosure is applicable to other types of agricultural implements. In some implementations, the lockout systems are actuated in response to deployment of gauge wheels of the header. In the flexible configuration, float arms of the header are freely pivotable about respective axes, and, in the rigid configuration, the float arms are retracted into contact with a portion of the header, thereby providing a cutterbar attached to the float arms in a rigid configuration.

Extension of the gauge wheels causes float arms and cutterbar to move into the rigid configuration. Retraction of the gauge wheels causes the float arms and cutterbar to move into the flexible configuration. In some instances, the lockout systems provide for abutting contact between the float arms and another portion of the frame without any adjustment provided either during manufacturing or in the field, thereby reducing manufacturing and maintenance time and complexity. Further, in some implementations, in the rigid configuration, torque applied to a lockout tube is reduced to zero or approximately zero, thereby reducing size, weight, and cost of the header. Additionally, lockout systems described herein are actuatable from a cab of a vehicle. Consequently, an operator avoids having to exit the cab of a vehicle in order to actuate a lockout system within the scope of the present disclosure.

Words of orientation, such as "up," "down," "top," "bottom," "above," "below," "leading," "trailing," "front," "back," "forward," and "rearward" are used in the context of the illustrated examples as would be understood by one skilled in the art and are not intended to be limiting to the disclosure. For example, for a particular type of vehicle in a conventional configuration and orientation, one skilled in the art would understand these terms as the terms apply to the particular vehicle.

For example, as used herein, with respect to an endless belt, unless otherwise defined or limited, the term "forward" (and the like) corresponds to a forward direction of travel of the belt, with respect to a supporting frame (e.g., a frame of a draper header), during normal operation of the belt. Likewise, the term "rearward" (and the like) corresponds to a direction opposite the forward direction of travel of the belt. In this regard, for example, a "forward facing" feature on an endless belt may generally face in the direction that the belt travels during normal operation, while a "rearward facing" feature may generally face opposite that direction.

Also as used herein, with respect to a header (or components thereof), unless otherwise defined or limited, the term "leading" (and the like) indicates a direction of travel of the header during normal operation (e.g., the forward direction of travel of a harvester vehicle carrying a header). Similarly, the term "trailing" (and the like) indicates a direction that is opposite the leading direction. In this regard, for example, a "leading" edge of a cutterbar of a draper header may be generally disposed at the front of the cutterbar, with respect to the direction travel of the draper header during normal operation (e.g., as carried by a harvester vehicle). Likewise, a "trailing" edge of the cutterbar may be generally disposed at the back or a side of the cutterbar opposite the leading edge, with respect to the direction of travel of the draper header during normal operation.

FIG. 1 shows an example draper header 100 that includes a frame 102 that supports a first side conveyor 104, a second side conveyor and 106, and a center conveyor 108. Each of the conveyors 104, 106, and 108 is configured as a belt-type conveyor extending over a respective circumferential length. The conveyors 104, 106, and 108 include endless belts 110, 112, and 114, respectively, that are moved in respective loops along the header 100 by motive devices, such as motors, gears, or internal belts. The conveyors 104 and 106 are disposed on opposing wings 118 and 116, respectively, of the header 100. In the illustrated example, the conveyor 104 includes two endless belts 110, and the conveyor 106 and two endless belts 112. In other implementations, the conveyors 104 and 106 may include additional or fewer endless belts. Further, although the conveyor 108 is shown as including a single endless belt 114, in other implementations, the conveyor 108 may include additional endless belts. The endless belts 110, 112, and 114 are supported on two or more rollers of the respective conveyors 104, 106, and 108. Although the draper header 100 is illustrated as a rigid or non-folding draper header, the scope of the present disclosure encompasses folding draper headers.

In some implementations the endless belts 110, 112, and 114 may be formed from elastomer-impregnated fabric belts. Generally, the endless belts 110 and 112 may be rotated such that upper surfaces of the endless belts 110 and 112 move inward along the header 100 in respective directions 120 and 122. In this way, material, such as severed crop material, is moved by the endless belts 110 and 112 to the center conveyor 108, which, in turn, uses the endless belt 114 to move the material off of the header 100. For example, the header 100 may offload the material onto a harvester vehicle to which the header 100 is attached. The header 100 also includes a cylindrical conveyor 124. The cylindrical conveyor 124 receives severed crop material from the center conveyor 108 and carries the crop material rearward (i.e., in a direction 126) through an aperture in the frame 102 located between the cylindrical conveyor 124 and the center conveyor 108 and, ultimately, into the harvester vehicle.

In the illustrated example, various cleats 130 are fixed to the surface of each of the endless belts 110, 112, and 114, with the cleats 130 generally extending in a direction transverse to the direction of travel of the respective endless belt 110, 112, or 114, e.g., directions 120, 122, and 126. In some implementations, the cleat 130 may extend less than an entire width of the endless belts 110, 112, and 114. For example, one or more of the cleats 130 may extend only partially across the respective width of the endless belts 110, 112, and 114, and, accordingly, may not extend to a leading edge or a trailing edge of the belts 110, 112, and 114.

The header 100 also includes a cutterbar 132 at a leading edge 133 of the header 100. The cutterbar 132 cuts crop material, such as to sever crop material from a field. The cutterbar 132 extends laterally along the header 100. In some implementations, the header 100 may also include a leading cover arranged between the cutterbar 132 and the endless belts 110, 112, and 114, with the leading cover extending at least partly over a leading edge of at least the belts 110 and 112. As shown in FIG. 1, for example, the header 100 includes an elongated row of interlocking crop ramp segments 134 that extend along the header 100.

As depicted, the header 100 also includes a trailing cover 136, which may be in the form of a back sheet deflector or rear frame cover, separated from the crop ramp segments 134 by a width 138. The trailing cover 136 serves to cover and protect various internal components of the header 100 and also generally defines a trailing end of a crop-carrying region of the header 100. In some implementations, the cleats 130 extend over the entire width 138. In other implementations, the cleats 130 extend over a portion of the width 138.

During a harvesting operation, a harvester vehicle carries the header 100 through an agricultural field in a nominal forward direction 140. As the header 100 is moved across the field, the cutterbar 132 operates to sever the crops at a location adjacent to the ground. The severed crop material generally falls in a trailing direction (i.e., generally opposite the direction 140), onto one or more of the three conveyors 104, 106, and 108. The conveyor 104 on the wing 118 carries the crop material in the direction 120, using the endless belts 110, toward the center of the header 100. The conveyor 106 carries the severed crop material in the direction 122, using the endless belts 112, toward the center conveyor 108, and the center conveyor 108 carries the severed crop material in the direction 126 towards and underneath the cylindrical conveyor 124. The severed crop material from the cylindrical conveyor 124 is transported in the direction 126 through the aperture in the frame 102 of the header 100 and into the agricultural harvester.

In the illustrated example, the conveyor 104 and the conveyor 106 are similarly configured, although the conveyors 104 and 106 carry crop material in opposite directions 120 and 122, respectively. In other implementations, the conveyors 104 and 106 can be configured differently. Generally, however, the description herein of the conveyor 104 is applicable to the conveyor 106, as well as other conveyors of other implementations.

Figure 2:
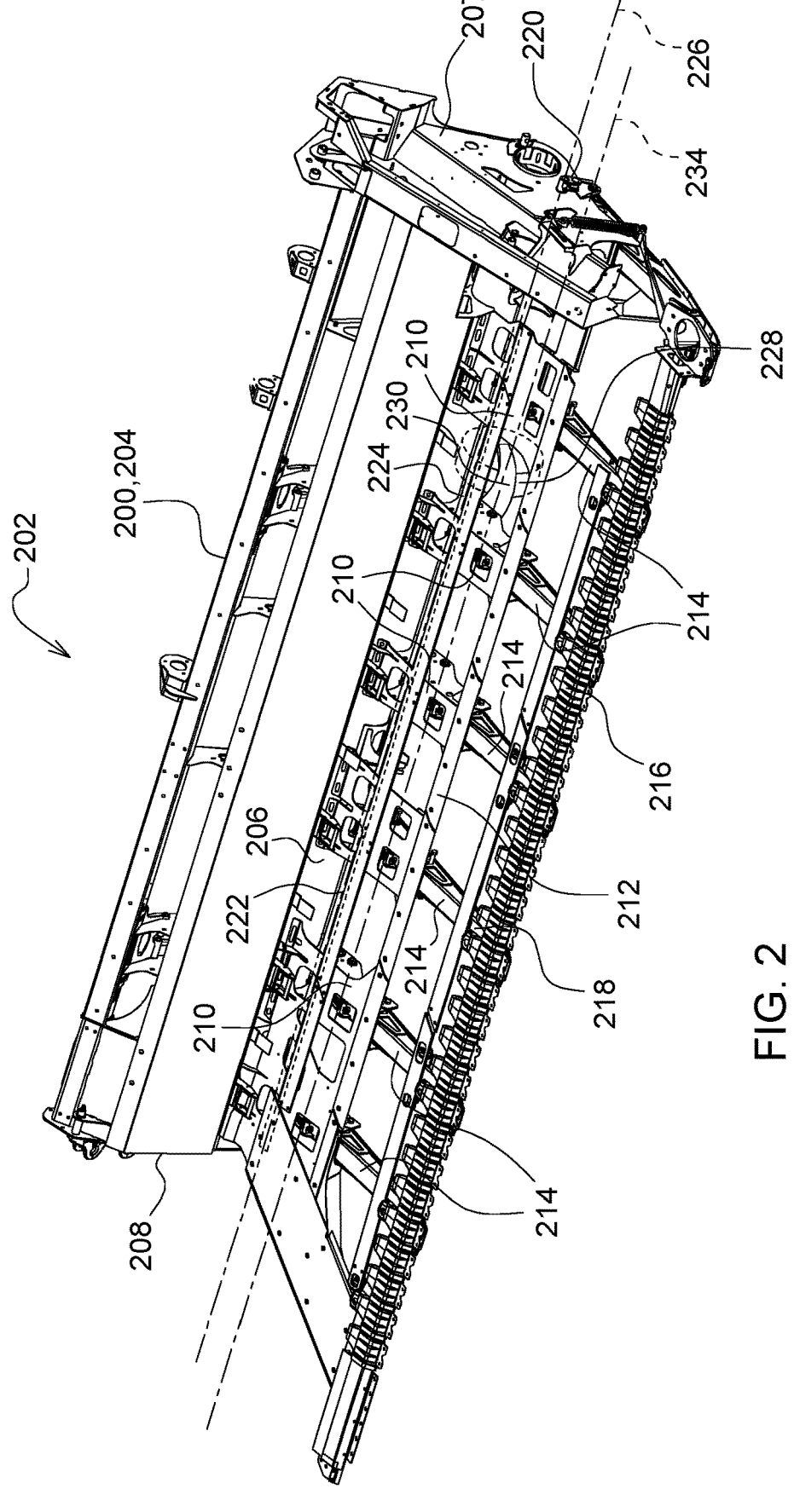
FIG. 2 is an oblique view of a portion of a frame of an example header, according to some implementations of the present disclosure.

FIG. 2 is a view of a portion of a frame 200 of a header 202, which may be similar to the header 100. The portion of the frame 200 illustrated corresponds to a portion of a wing 204 of the header 202. The wing 204 may be similar to wing 118 of the header 100. The frame 200 includes a beam 206 extending laterally along the frame 200. A back section 208 is coupled to the beam 206 and extends therefrom. The back section 208 also extends laterally along the frame 200. An outboard side section 207 connects to the beam 206 and back section 208 and defines a lateral end of the frame 200. A plurality of mounting brackets 210 are also coupled to the beam 206. With the header 202 conventionally oriented, the brackets 210 general extend in a direction corresponding to a forward direction. The frame 200 also includes a laterally extending cross tube 212 that connects to each of the mounting brackets 210. In some implementations, the cross tube 212 may have a square, rectangular, or circular cross-sectional shape and may define a central passage. However, the cross tube 212 may have other cross-sectional shapes. Float arms 214 are pivotably coupled to the mounting brackets 210, and a cutterbar 216 is coupled to distal ends 218 of each of the float arms 214. Similar to the cutterbar 132, the cutterbar 216 is a reciprocating cutterbar.

In some implementations, the mounting brackets 210 and corresponding float arms 214 are laterally separated from adjacent mounting brackets 210 and corresponding float arms 214 by approximately 2.5 feet (ft) (0.8 meters (m)). In other implementations, the lateral separation 215 may be greater than or less than 2.5 ft (0.8 m). In still other implementations, the lateral separation 215 may vary. Thus, in some implementations, the lateral separation 215 between some adjacent mounting brackets 210 and corresponding float arms 214 may be uniform while the lateral separation between other adjacent mounting brackets 210 and corresponding float arms 214 may be non-uniform.

With the header 202 in an unsecured or flexible configuration, each of the float arms 214 is able to pivot independently of the other float arms 214. As a result, when the float arms 214 are in contact with the ground and propelled over the ground, such as during a harvesting operation, each of the float arms 214 is able to follow a topography or contour of the ground. In response to the float arms 214 conforming movement to the contour of the ground, the cutterbar 216 flexes to also conform to the contour of the ground. As a result, a portion of the crop extending from the ground and remaining in a field may be generally consistent, e.g., a height by which the crop remaining in field extends from the ground is generally uniform.

In a rigid configuration in which the float arms 214 are held in an abutting relationship against a portion of the frame 200, such as the cross tube 212, the float arms 214 are prevented from following a contour of the ground, and the cutterbar 216 is maintained in a generally straight and rigid configuration, e.g., the cutterbar 216 maintains a generally straight, unbent shape.

The header 202 also includes a lockout system 220 that is operable to move the float arms 214 and the cutterbar 216 between the flexible configuration and the rigid configuration. In some implementations, the header 202 includes a lockout system 220 for each wing 204. The separate lockout systems 220 are operable to move the float arms 214 and associated portion of the cutterbar 216 of one wing between the rigid configuration and the flexible configuration independently of the float arms 214 and associated portion of the cutterbar 216 of the other wing. Thus, in some implementations, the header 202 may include two lockout systems 220. In other implementations, the header may include a single lockout system 220 for all of the wings of the header 202. In still other implementations, the header 200 may include more than two lockout systems.

The lockout system 220 includes a rotatable component, which, in the example of FIG. 2, is a lockout tube 222. In some implementations, the lockout tube 222 is in the form of a shaft. The lockout tube 222 extends laterally along the header 202 through apertures 224 formed in each of the mounting brackets 210. The lockout tube 222 is rotatable relative to the mounting brackets 210 about a centerline 226.

The header also includes gauge wheels 228, as shown in FIG. 2. In some implementations, the header 200 includes two gauge wheels 228 distributed laterally along each wing of the header 200. In other implementations, the header 200 includes fewer or additional gauge wheels 228. FIG. 2 illustrates a single gauge wheel 228, although, as explained earlier, the scope of the disclosure is not so limited. The gauge wheels 228 are pivotably connected to the frame 200, such as mounting brackets 210, by an arm 230. The gauge wheels 228 are pivotable between a retracted position in which contact between the ground and the gauge wheels is avoided and an extended position in which the gauge wheels are positioned to contact the ground.

Figure 3:
FIG. 3 a detail view of a portion of a frame of an example header, according to some implementations of the present disclosure.

FIG. 3 is a detail view of a portion of a frame 300 of an example header 302 within the scope of the present disclosure. The frame 300 may be similar to the frame 200. The frame 300 includes a laterally extending beam 304, similar to beam 206, and a mounting bracket 306, similar to mounting bracket 210. A float arm 308 is pivotably mounted to the mounting bracket 306. A gauge wheel, which may be similar to gauge wheel 228, is coupled to the frame 300 via an arm. The arm may be similar to arm 230, described earlier. The gauge wheel is rotatably coupled to the arm, and the arm is pivotably mounted to the mounting bracket 306. A lockout tube 314, similar to lockout tube 222, extends laterally though apertures 316 formed in the mounting bracket 306 and a side 324 of the frame 300. The lockout tube 314 is rotatable about a centerline 318, similar to centerline 226, that extends longitudinally along the lockout tube 314. An arm 320 is coupled to the lockout tube 314. The arm 320 couples to an actuator 322. The actuator 322 is coupled to the header 302, such as via a bracket 323 provided on the side 324. In some instances, the actuator 322 is pivotably mounted to the side 324. In the illustrated example, the actuator 322 is a hydraulic actuator. Particularly, the example actuator 322 is a hydraulic cylinder. However, in other implementations, other types of actuators can be used.

The actuator 322 includes a body portion 326 and a rod portion 328. The rod portion 328 is extendable from and retractable into the body portion 326. In the illustrated example, extension of the rod portion 328 in the direction of arrow 330 causes rotation of the lockout tube 314 in the direction of arrow 332. As a result, the float arms and cutterbar of the header are moved into a rigid configuration. Retraction of the rod portion 328 in the direction of arrow 334 causes rotation of the lockout tube 314 in the direction of arrow 336. As a result, the float tubes and the cutterbar are moved into a flexible configuration. Although a single float arm 308 is shown, in some implementations, the lockout tube 314 is coupled to a plurality of float arms 308, and the cutter bar is coupled to the plurality of float arms 308 such that movement of the float arms 308 into the flexible or rigid configuration likewise moves the cutterbar into the flexible or rigid configuration, respectively.

In some implementations, a lockout system is provided between the lockout tube 314 and the float arms, such as float arm 308 shown in FIG. 3. An example lockout system and operation thereof is described in more detail below. However, while a lockout system may be used in some implementations, in other implementations, a lockout system may be omitted. Thus, in some implementations, the lockout 314 is coupled directly or indirectly to the float arms 308 without the use of a lockout system.

As a result, a lockout system coupled to the lockout tube 314 is placed into a locked configuration, causing the float arms 308 and cutterbar of the header 302 to be placed into a rigid configuration. Retraction of the rod portion 328 places the lockout system in an unlocked configuration, placing the float tubes 308 and the cutterbar into a flexible configuration.

In some instances, the arm 320 is in the form of a clevis that includes opposing sides 338 and 340. An end of the rod portion 328 is received between the opposing sides 338 and 340, and the rod portion 328 is secured between the opposing sides 338 and 340, such as by a fastener (e.g., a bolt), a pin, or in any other way that couples the rod portion 328 to the arm 320. In other implementations, the rod portion 328 includes a clevis, and the arm is received into a slot formed by the clevis. The clevis is coupled to the end of the rod portion 328, such as with a fastener or pin or in another manner. The rod portion 328 and the arm 320 are pivotably connected.

Similarly, in some implementations, the actuator 322 is attached to the side 324, such as by a bracket. In some instances, the bracket forms a clevis, and a protrusion of the actuator 322 (such as formed on the body portion 326) is received into the clevis and is coupled thereto. In other implementations, the bracket is received into and coupled to a clevis formed on the actuator 322. In some instances, these coupling arrangement provides for a pivotable connection. Thus, the actuator 322 is able to pivot relative to the side 324 or another part of the header 302 to which the actuator 322 is attached. Still further, the actuator 322 may be connected to the header 302 in other ways.

Figure 4:
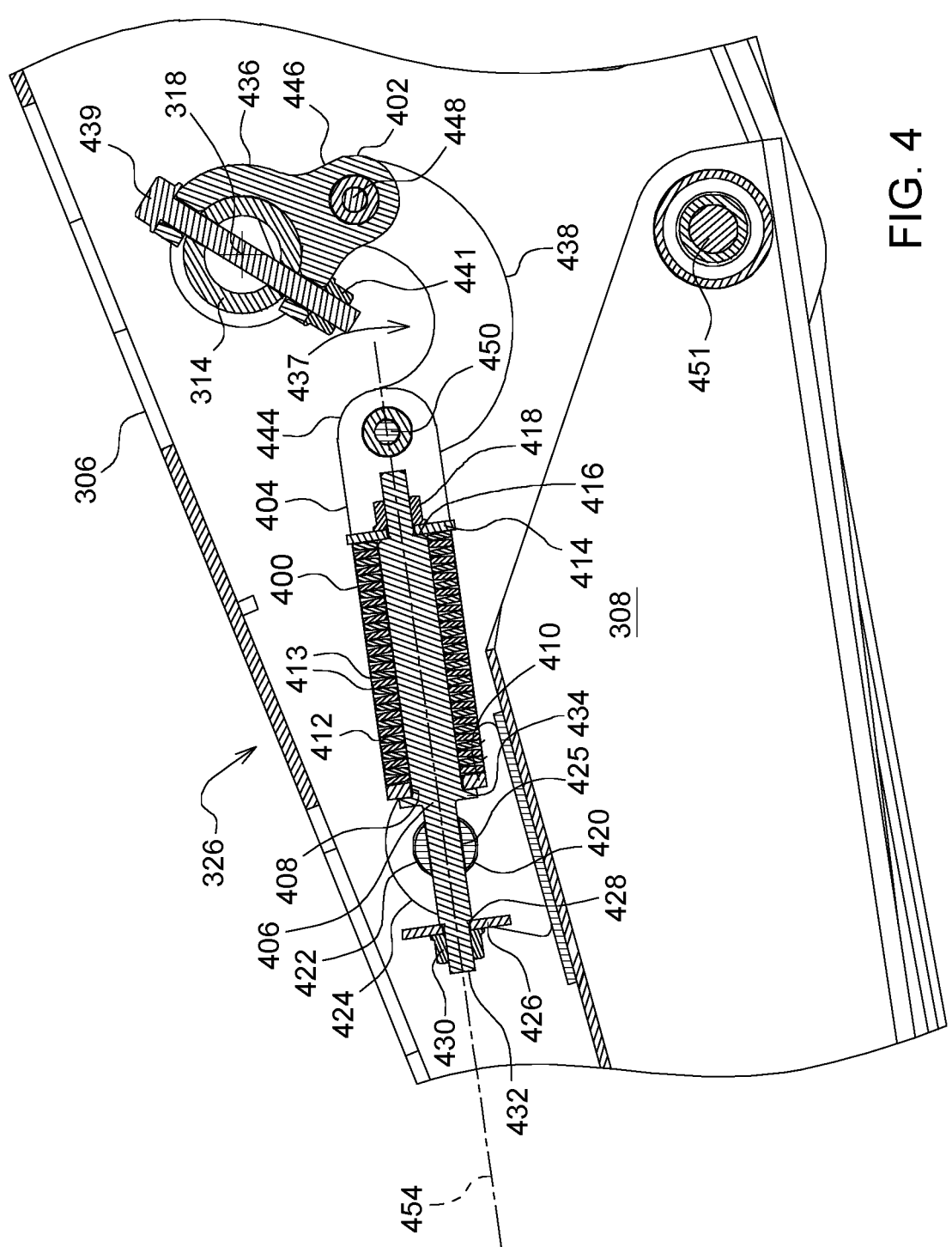
FIG. 4 is cross-sectional view of portions of an example lockout system, according to some implementations of the present disclosure.

As explained earlier, in some implementations, the header 302 also includes a lockout system 326, shown in FIG. 4, that functions to move the float arms 308 and associated portions of a cutterbar provided at the distal ends of the float arms 308 of the header 302 between a flexible configuration and a rigid configuration. The lockout tube 314 is connected to the lockout system 326 such that rotation of the lockout tube 314 in a first direction (indicated by arrow 332) causes the lockout system 326 to lockingly position the float arms 308 into the rigid configuration. Conversely, rotation of the lockout tube 314 in a second direction, opposite the first direction, (indicated by arrow 336) causes the lockout system 326 to move the float arms 308 from the rigid configuration into the flexible configuration.

FIG. 4 is a cross-sectional view of additional portions of the example lockout system 326. The lockout system 326 also includes a tensioner 400 and a linkage 402 coupled to the lockout tube 314. The tensioner 400 includes a bracket 404, a shaft 406 extending through an aperture 408 in a side 410 of the bracket 404, and a biasing component 412 captured on the shaft 406 between the side 410 of the bracket 404 and a flange 414 secured to the shaft 406. In some implementations, the flange 414 may be secured to the shaft between a shoulder 416 and a nut 418 threadably received onto the shaft 406. In other implementations, the flange 414 may be secured to the shaft 406 in other ways, such as by welding, a press fit, or by being integrally formed onto the shaft 406.

In some implementations, the biasing component 412 is a spring, such as a coil spring. In some implementations, the biasing component 412 is a plurality of biasing components. For example, in some implementations, the biasing component 412 is a plurality of Bellville washers 413 stacked along a length of the shaft 406, as shown in FIG. 4. In some implementations, the Bellville washers are arranged in pairs, such that a base of each Bellville washer in a pair abuts each other. Pairs of the Bellville washers may be arranged adjacent to each other along a length of the shaft 406, as shown, for example, in FIGS. 4, 6, and 7. In some implementations, 32 Bellville washers may be used. However, additional or fewer Bellville washers may be used, and the number of Bellville washers may vary depending upon, for example, sizes and masses of the different components of a header.

In still other implementations, the biasing component 412 may be or include a coil spring. For example, in some instances, the biasing component 412 may include a plurality of coils springs. One or more of the coils springs may be received onto the shaft 406. In still other implementations, the biasing component 412 may be another type of spring.

The tensioner 400 is pivotably coupled to the float arm 308 by a pin 420 coupled to the float arm 308. In the illustrated example, the pin 420 extends through apertures 422 formed in a clevis 424 that is attached to the float arm 308. The shaft 406 extends through a bore 425 formed through the pin 420. A flange 426 captures the shaft 406 onto the pin 420. In some implementations, the flange 426 may be a washer secured to the shaft 406 between a shoulder 428 and a nut 430 threadably received onto a threaded portion 432 of the shaft 406. In other implementations, the flange 426 may be secured to the shaft 406 in other ways, such as a press fit or welding, or the flange 426 may be integrally formed on the shaft 406. The shaft 406 also includes an enlarged portion 434 that abuts against the side 410 of the bracket 404. Engagement between the side 410 and the enlarged portion 434 allows the biasing component 412 to be preloaded between the side 410 and the flange 414. In some implementations, the biasing component 412 may not be preloaded.

The preload applied to the biasing component 412 may be selected to ensure a force applied to the float arms 308 of a lockout system 326 by the biasing component 412 lifts the float arms 308 into abutting contact between all of the float arms 308 and a portion of the frame 300, such as a cross tube similar to cross tube 212 shown in FIG. 2. Thus, the preload ensures that a force ultimately provided by the biasing component 412 as the lockout system 326 is moved into the rigid configuration fully actuates all of the float arms 308 notwithstanding any variations in the header 302, such as manufacturing variations that may otherwise prevent all of the float arms 308 from being in abutting contact with the cross tube when the lockout system 326 is in the rigid configuration. As a result, lockout systems of the present disclosure are operable to ensure full retraction of all of the float arms of a header when placed in the rigid configuration without adjustment during manufacturing or sometime later in the field, such as by a user or technician. Thus, the lockout systems and associated headers of the present disclosure reduce maintenance thereto, improves performance of operation of the headers, increases productivity of the headers, and reduces costs of operation of the headers.

The linkage 402 includes a first link 436 coupled to the lockout tube 314 and a second link 438 pivotably coupled to the first link 436 and the bracket 404. In the illustrated example, the first link 436 is attached to the lockout tube 314 with a fastener 439, such as a bolt. However, in other implementations, the first link 436 may be attached to the lockout tube 314 in other ways, such as by welding, interference fit, an adhesive, or by being integrally formed on the lockout tube 314. Also, in the illustrated example, a nut 441 is used to secure the fastener 439 and the first link 436 to the lockout tube 314.

Figure 5:
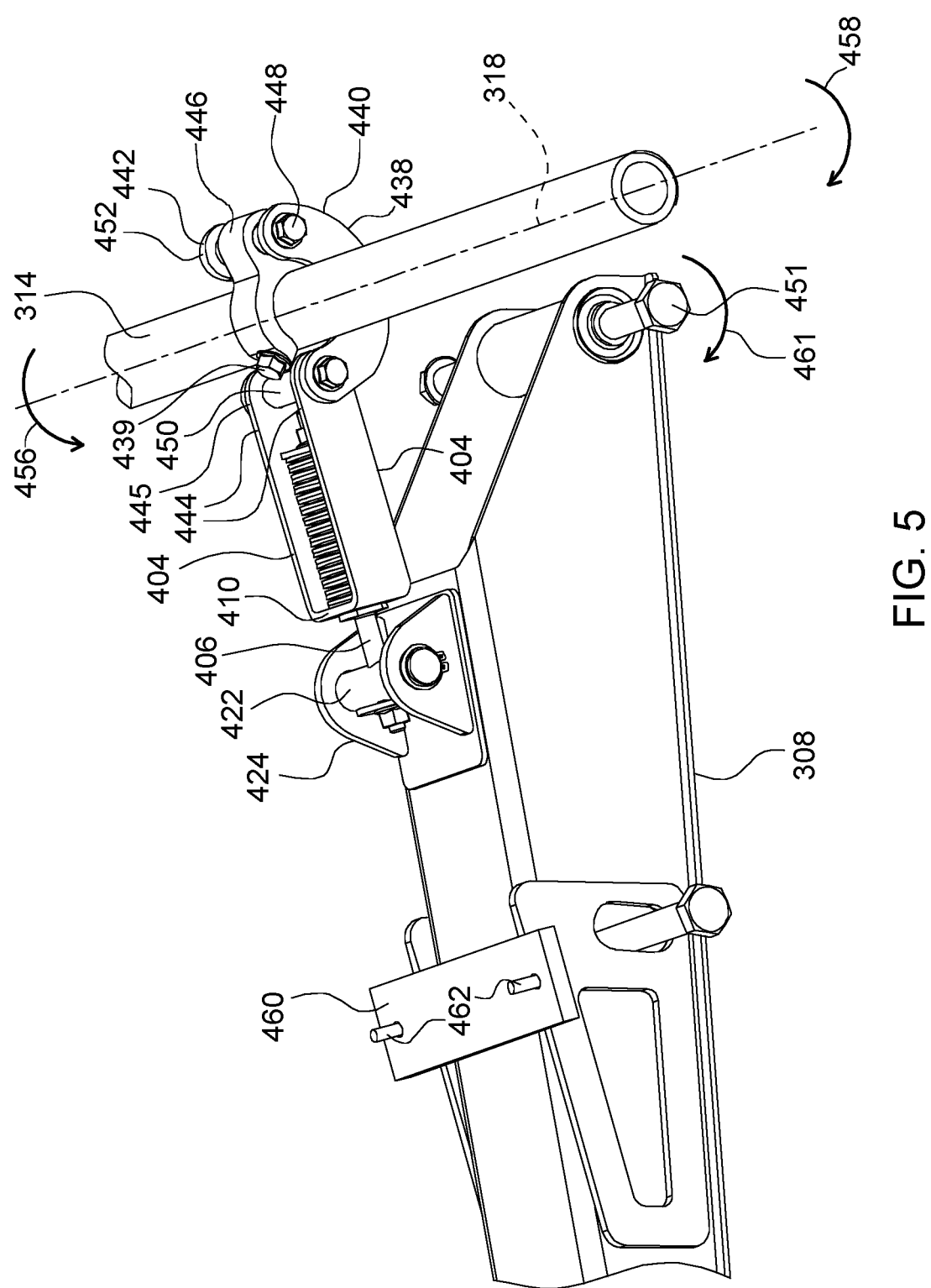
FIG. 5 is an oblique view of the lockout system of FIG. 4.

Referring to FIGS. 4 and 5, the bracket 404 has a general U-shape, and the second link 438 includes a first side 440 and a second side 442. Free ends 444 of the bracket 404 are sandwiched between the first and second sides 440 and 442 at a first end 445 of the second link 438. A tab 446 formed on the first link 436 is disposed between the first and second sides 440 and 442 of the second link 438 at a second end 452 of the second link 438. A pin 448 extends through the first and second sides 440 and 442 at the second end 452 of the second link 438 and the tab 446 of the first link 436 to pivotably couple the first link 436 and the second link 438. A pin 450 extends between the free ends 444 of the bracket 404 and the first and second sides 440 and 442 at the first end 445 of the second link 438 to pivotably couple the second link 438 and the bracket 404. In some implementations, the pins 448 and 450 may be a rod or a fastener, such as a bolt. However, the pins 448 and 450 may have other forms to enable the first link 436 to pivot relative to the second link 438 and the bracket 404 to pivot relative to the second link 438. The float arm 308 is pivotable about a pin 451 that pivotably couples the float arm 308 to the mounting bracket 306. The pin 451 may be, for example, a fastener (e.g., a bolt), a shaft, or other component operable to permit pivoting movement of the float arm 308 relative to the mounting bracket 306. FIG. 5 also shows an impact absorber component 460 that is attached to the frame 300 of the header 302, such as the cross tube, and contacts a float arm 308 when retracted into the rigid configuration. The impact absorber component 460 may be attached to the cross tube with fasteners 462, which may be, for example, bolts, pins, or rivets As shown in FIGS. 4 through 7, the second link 438 has an arcuate shape that provides a relief or recess 437 that receives the lockout tube 314. The recess 437 formed by the arcuate shape receives the lockout tube 314, allowing the centerline 318 of the lockout tube 314 to intersect with centerline 454 of shaft 406, resulting in the elimination of torque in the lockout tube 314, as described in more detail below. In some instances, the centerlines 318 and 454 may be slightly offset due to slight variations in size of the components, movement of the different components, or variations in components, for example. These slight variations may produce an offset between the centerlines 318 and 454 that, in some cases, may be unavoidable. However, for the purposes of the present disclosure, intersection of the centerlines 318 and 454 is intended to encompass the slight offsets therebetween which may occur.

As shown in FIG. 5, rotation of the lockout tube 314 in the direction of arrow 456 to a first position results in the float arms 308 being placed into a fully retracted position, which corresponds to the rigid configuration of the float arms 308 and cutterbar, such as cutterbar 216. Rotation of the lockout tube 314 in the direction of arrow 458 to a second position results in the float arms 308 being placed in a fully extended position, which corresponds to the flexible configuration of the float arms 308 and cutterbar.

Figure 6:
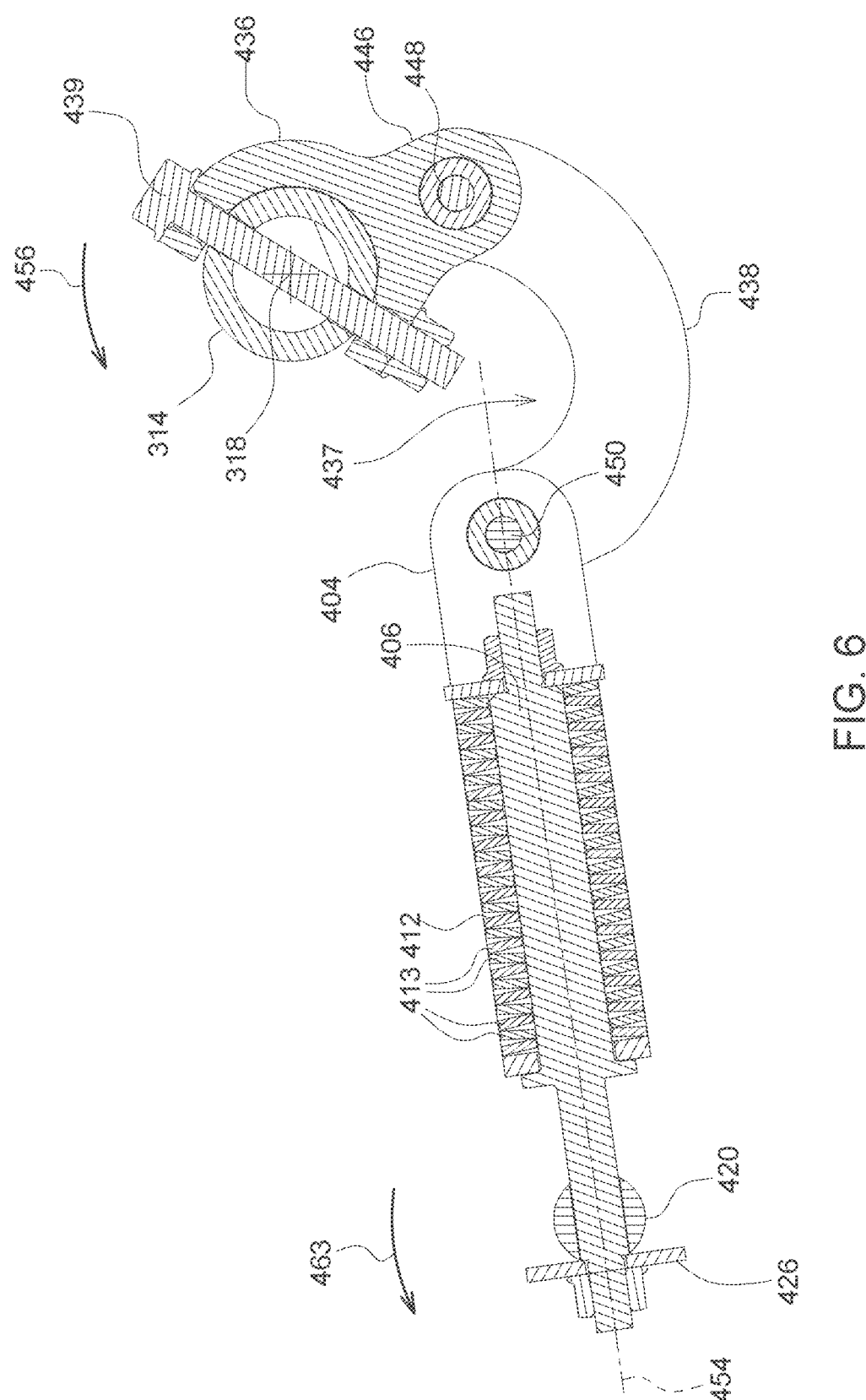
FIG. 6 is a detailed, cross-sectional view of a portion of the lockout system of FIG. 4.
Figure 7:
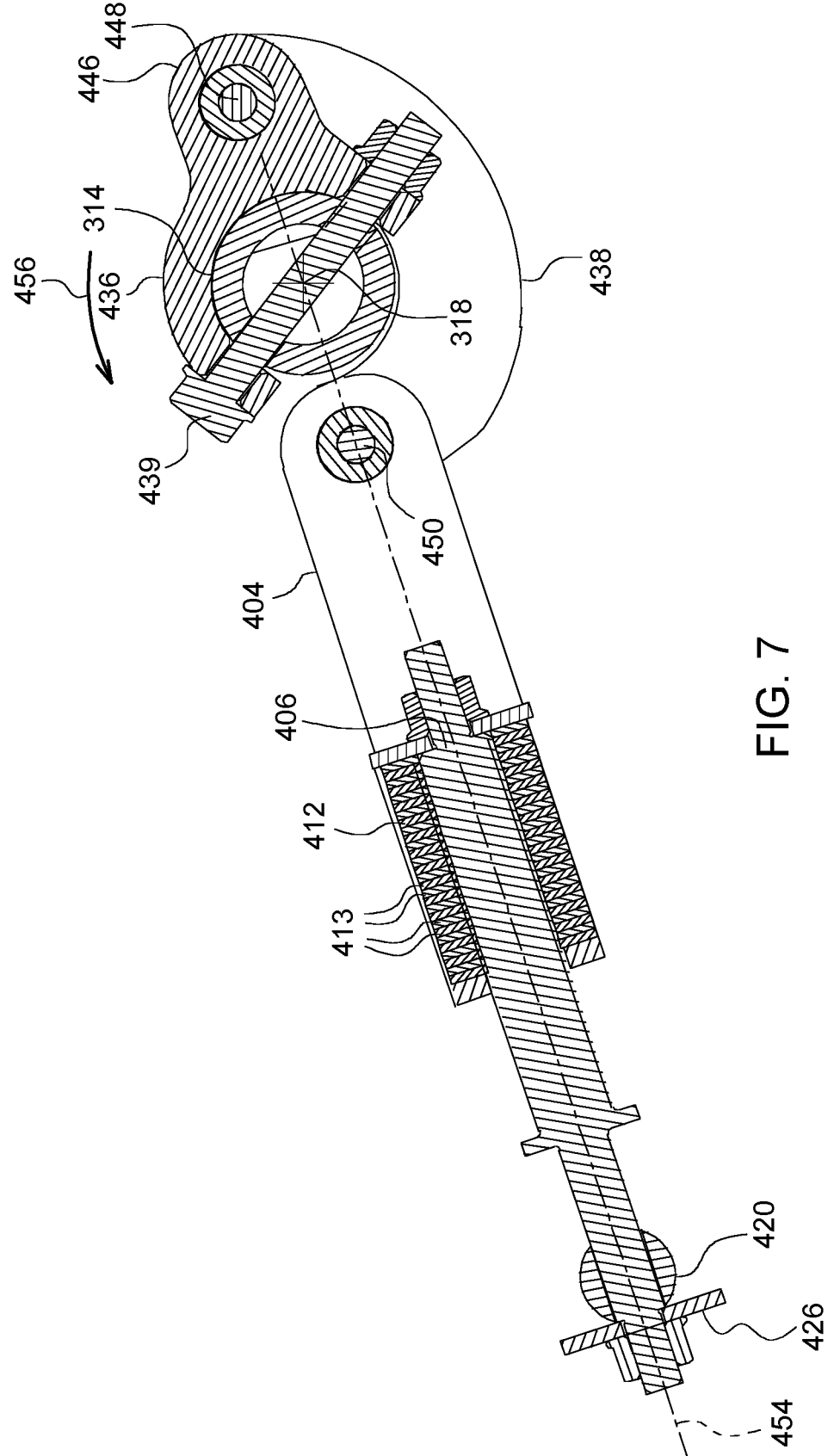
FIG. 7 is another detailed, cross-sectional view of a portion of the lockout system of FIG. 4.

FIGS. 4, 6, and 7 illustrate actuation of the lockout system 326 between the flexible configuration and the rigid configuration. In FIG. 6, the lockout system 326 is in the flexible configuration in which the floating arms 308 are in a fully extended position. As a result, the float arms 308 are freely pivotably about pin 451, and each of the float arms 308 coupled to the lockout system 326 are able to pivot independently of the other float arms 308. Although the present example describes a lockout system that can be included on a single wing of a header, in other implementations, a single lockout system operable to position all of the float arms of a header between the flexible configuration and a rigid configuration may be used.

Referring to FIGS. 4 and 6, the lockout tube 314 is angularly oriented in the second position such that the biasing component 412 is unloaded, other than a preload that may be applied to the biasing component 412. With the lockout tube 314 in the second position, the float arms 308 are freely pivotable about the pin 451, allowing the float arms 308 to follow a contour of the ground when the float arms 308 are placed in contact with the ground. As the lockout tube 314 is rotated in the direction of arrow 456, the shaft 406 translates relative to and rotates with the pin 420. As a result, the shaft 406 is both rotated and translated towards the lockout tube 314. As shown in FIG. 6, the shaft 406 is displaced to cause the flange 426 to come into contact with the pin 420. Further rotation of the lockout tube 314 in the direction of arrow 456 results in further displacement and rotation of the shaft 406, which, in turn, causes further compression of the biasing component 412.

With the flange 426 in contact with the pin 420, as the lockout tube 314 continues to be rotated in the direction of arrow 456, the float arm 308 is pivoted about the pin 451 in the direction of arrow 461 (shown in FIG. 5). Moreover, as the shaft 406 is pivoted in the direction of arrow 463, an amount of torque applied to the lockout tube 314 decreases as the centerline 454 of the shaft 406 approaches the centerline 318 of the lockout tube 314.

FIG. 7 shows the lockout system 326 in the rigid configuration. As shown in FIG. 7, the lockout tube 314 is moved into the first position. As the lockout tube 314 is moved from the position show in FIG. 6 to the position shown in FIG. 7, the float arms 308 are retracted as a result of the contact between the flange 426 and the pin 420. With the locking system 326 in the rigid configuration, the float arms 308 are fully retracted and in abutting contact with the cross tube, such as cross-tube 212, or another component of the frame 300; the lockout tube 314 resides in the curved recess 437 formed by the second link 438; and the centerline 454 of the shaft 406 intersects the centerline 318 of the lockout tube 314. As a result of the intersection of the centerline 454 and the centerline 318, toque applied to the lockout tube 314 is reduced to approximately zero. Further, with the float arms 308 in the rigid configuration, the cutterbar is also placed into a straight and rigid configuration.

With the torque applied to the lockout tube 314 being effectively zero when the float arms 308 are in the retracted and rigid configuration, a size of lockout tube 314 may be reduced, which results in a weight, size, and cost reduction. Additionally, compression of the biasing component 412 provides a force that is sufficient to retract all of the float arms 308 into abutting contact with a component of the frame 300, such as a cross-tube similar to cross-stube 212, notwithstanding any dimensional variations imparted to the frame 300 during manufacturing, for example. Consequently, the lockout system 326 is operable to actuate all the float arms 308 into contact with a portion of the frame 300 without preliminary adjustment during manufacturing or subsequent adjustment when the header has entered use. Thus, the lockout system 326 avoids an adjustment preformed during manufacturing or sometime thereafter, such as by a technician or user, to ensure full actuation of the float arms 308 into the rigid configuration.

An actuator operable to move the cutterbar between the flexible configuration and the rigid configuration (e.g., via actuation of float arms to which the cutterbar is coupled), such as the actuator 322 described earlier, is powered using a power source also used to operate the gauge wheels. For example, the actuator operable to actuate the cutterbar between the rigid configuration and the flexible configuration is powered using hydraulic fluid that is also used to extend and retract the gauge wheels. In some instances, the hydraulic fluid used to operation the actuator that is used to move the cutterbar between the rigid configuration and the flexible configuration is obtained from a hydraulic circuit that is used to actuate an actuator that is used to extend and retract the gauge wheels.

In some instances, pressurized hydraulic fluid used to operate a first actuator to extend the gauge wheels is also simultaneously used to actuate a second actuator to place the cutterbar in the rigid configuration. In some implementations, the second actuator is used to pivot float arms into a rigid configuration that, in turn, places the cutterbar into the rigid configuration. Similarly, in some instances, pressurized hydraulic fluid that is used to retract the gauge wheels via actuation of the first actuator is simultaneously used to move the cutterbar from the rigid configuration into the flexible configuration via pivoting of the float arms to the flexible configuration in response to actuation of the second actuator.

Figure 8:
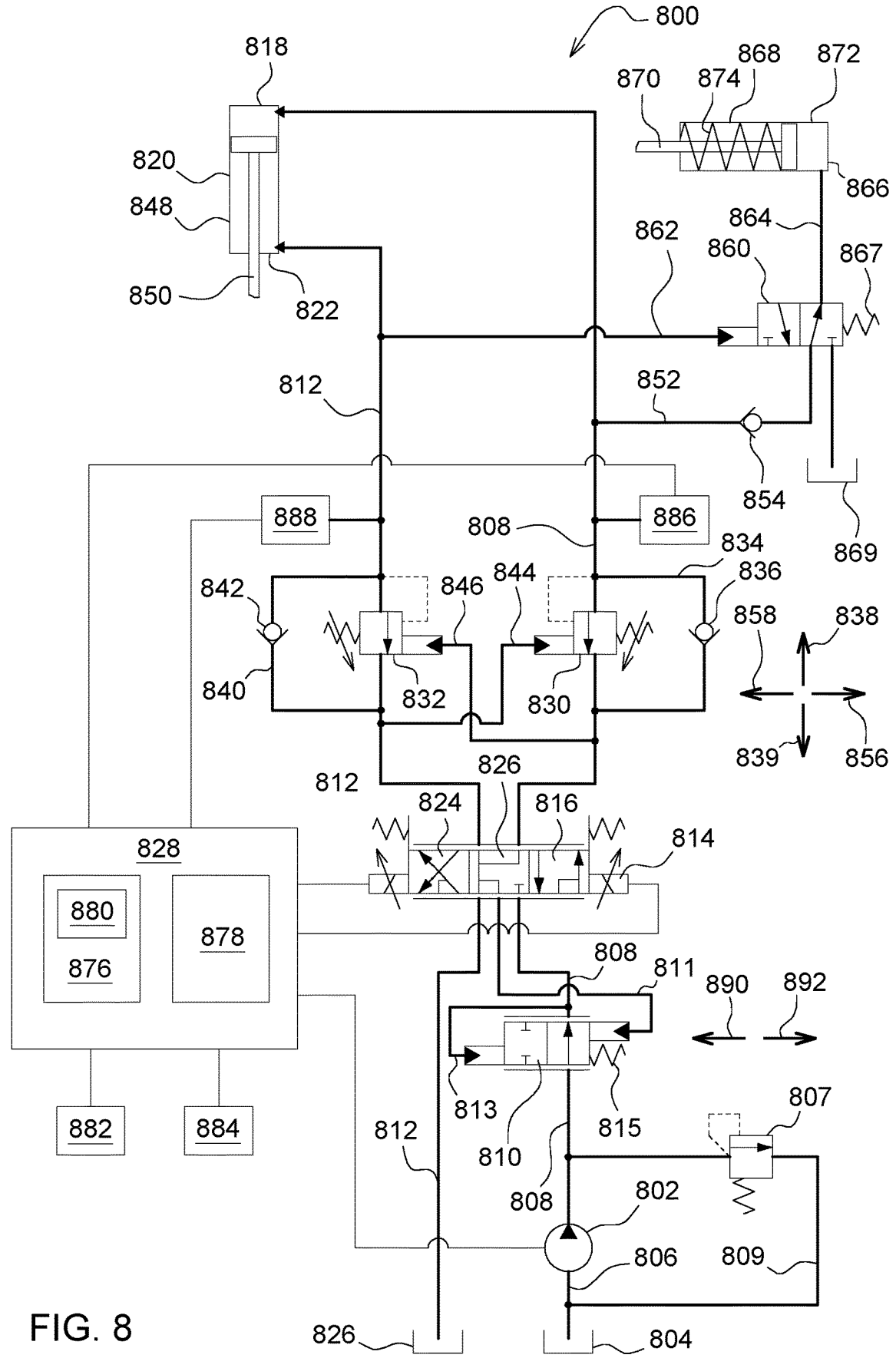
FIG. 8 is a schematic of an example hydraulic system, according to some implementations of the present disclosure.

FIG. 8 is a schematic of an example hydraulic system 800 used to extend a gauge wheel while simultaneously moving a cutterbar into a rigid configuration as well as retract the gauge wheel while simultaneously moving the cutterbar into a flexible configuration. The hydraulic system 800 includes a pump 802 that is operable to pressurize hydraulic fluid collected in a sump 804. The pump 802 draws hydraulic fluid from the sump 804 through a line 806, pressurizes the hydraulic fluid, and outputs the pressurized hydraulic fluid through a line 808. A pressure relief valve 807 is provided in a line 809 in fluid communication with line 808. The pressure relief valve 807 opens when a hydraulic pressure of the hydraulic fluid in line 808 exceeds a selected pressure. When the hydraulic pressure in line 808 exceeds the selected pressure, the pressure relief valve 807 opens, redirecting the hydraulic fluid through the line 809 and to the sump 804. For pressures less than the selected pressure, the pressure relief valve 807 remains closed.

A valve 810 is disposed in the line 808. The valve 810 operates to provide variable fluid flow through the valve 810 between a fully open position and a fully closed position. As a pressure difference varies between the fluid pressure in the line 808 and the line 812, a position of the valve 810 may vary to alter an amount of fluid flow through the valve 810

(and, hence, a fluid pressure within the hydraulic system 800), including a fully opened condition and a fully closed condition.

In the illustrated example, the valve 810 is a proportional two-position pressure compensation valve. In a first position, which, in this example, defines a default position, fluid flow through the valve 810 is provided. In a second position, fluid flow through the valve 810 is prevented. Hydraulic pressure from line 808 is transmitted to the valve 810 via a line 813. Hydraulic pressure from line 812 is transmitted to the valve via a line 811. A spring 815 of the valve 810 maintains the valve 810 in the default where a difference between the hydraulic pressures in line 808 and 812 is below a selected level. The selected pressure at which the valve 810 moves from the default position to a second position in which flow through line 808 is prevented can be altered by altering a spring constant of spring 815. Although the valve 810 is described as a proportional valve in some implementations, in other implementations, the valve 810 is a non-proportional valve.

The valve 810 operates to maintain the valve 810 in an open condition so long a pressure difference between hydraulic pressure in line 808 and hydraulic pressure in line 812 is at a selected level or within a selected range. Thus, the valve 810 operates to maintain hydraulic pressure within the hydraulic system 800 at a desired pressure level. In some implementations, the valve 810 operates to maintain pressure within the hydraulic system 800 at 80 pounds per square inch (psi) (0.55 megapascals (MPa)). However, in other implementations, the valve 810 may be used to maintain pressure at any desired pressure or range of pressures. Still further, in other implementations, the valve 810 may be omitted.

Lines 808 and 812 are also connected to a valve 814. The valve 814 is a proportional, three-position solenoid operated valve that is used, in part, to release excess pressure from the hydraulic system 800 in response to detected bump and rebound movements of a gauge wheel. The valve 814 functions to direct hydraulic fluid in a first manner to extend a gauge wheel and direct hydraulic fluid in a second manner to retract the gauge wheel. The valve 814 also includes functionality to reduce hydraulic pressure within the hydraulic system 800 when excessive hydraulic pressure is detected in order to avoid damage to the hydraulic system 800. Excessive hydraulic pressure may occur when the gauge wheel experiences a sudden bump or rebound during operation.

In a first position in which a first portion 816 of the valve 814 is in fluid communication with lines 808 and 812, hydraulic fluid in line 808 is permitted to pass through the valve 814 and through line 808, to a first end 818 a first actuator 820, described in more detail below. Similarly, with the valve 814 in the first position, hydraulic fluid from the first actuator 820 exits from a second end 822 of the first actuator 820, passes through line 812, through the valve 814, and into a sump 826. In some implementations, the sump 826 and the sump 804 are the same. In a second position in which the second portion 824 of the valve 814 is in fluid communication with lines 808 and 812, hydraulic fluid from line 808 from pump 802 is directed to the second end 822 of the first actuator 820 via a portion of the line 812. Additionally, hydraulic fluid from the first end 818 of the first actuator 820 is passed through a portion of the line 808, through the valve 814, into the line 812, and into sump 826. As explained earlier, the valve 814 is a proportional valve, so positions of the valve 814 associated with the first portion 816 or the second portion 824 correspond to ranges of positions. Each position within the range of position associated with portions 816 and 824 of valve 814 provide for different amounts of flow through the valve 814.

However, if a gauge wheel experiences a sudden bump during operation, causing the gauge wheel to move towards the retracted position, an increase in pressure occurring in line 808 is sensed, such as with a pressure sensor, and, if the sensed pressure exceeds a selected pressure, a signal is generated and sent (such as by a controller, e.g., controller 828 described in more detail below) to the valve 814, causing the valve 814 to move to a third position in which a third portion 826 is in fluid communication with the lines 808 and 812. In this position, hydraulic fluid from the pump 802 is prevented from entering line 808 or line 12 and hydraulic fluid within lines 808 and 812 is permitted to drain into sump 826. Similarly, if a gauge wheel experiences a sudden rebound during operation, causing the gauge wheel to move towards the extended position, an increase in pressure occurring in line 812 is sensed, such as with a pressure sensor. If the sensed pressure exceeds a selected pressure, a signal is generated and sent, such as by a controller (e.g., controller 828, to the valve 814, causing the valve 814 to move to the third position associated with the third portion 826 of the valve 814.

In some instances, because the valve 814 is a proportional valve, a rate at which pressure is released from the hydraulic system 800 is controlled. In some implementations, a non-proportional valve is used. In some implementations, the valve 814 is moved back to the first position or the second position, as desired, after pressure within the line 808, line 812, or both has been reduced to a desired level. In other implementations, a configuration of the valve 814 is different from the example illustrated in FIG. 8. For example, in some implementations, the third portion 826 may be configured differently (e.g., the third portion 826 may be configured to prevent fluid flow through both lines 808 and 812 or, in other instances, the third portion 826 may be omitted).

Pressure relief valves 830 and 832, also referred to as counterbalance valves, are provided along lines 808 and 812, respectively. Pressure relief valves 820 and 822 are cross-detecting valves. The pressure relief valve 830 is in fluid communication with the hydraulic fluid in line 808, and the pressure relief valve 832 is in fluid communication with the hydraulic fluid in line 812. The pressure relief valves 830 and 832 are in a normally closed position. The pressure relief valve 830 includes a line 834 that allows passage of hydraulic fluid around the pressure relief valve 830. The line 834 includes a check valve 836 that allows fluid flow only in the direction of arrow 838 but prevent fluid flow in the direction of arrow 839. Thus, when hydraulic fluid is flowing through line 808 in the direction of arrow 838, the hydraulic fluid flows through line 834, bypassing the normally closed pressure relief valve 830.

Although counterbalance valves represent one approach to controlling hydraulic pressure within hydraulic system 800, other types of valves can be used to control hydraulic pressure within the hydraulic system 800. For example, one or more relief valves, reducing valves, sequence valves, counterbalance valves, unloading valves, or a combination thereof can be used to control pressure within the hydraulic system 800. Further, one or more of these valves or a combination thereof can be used to control hydraulic pressure in the various other example hydraulic systems described herein, such as hydraulic systems 900, 1000, or 1100, described in more detail below.

The pressure relief valve 832 is configured similarly to that of pressure relief valve 830. The pressure relief valve includes a line 840 that includes a check valve 842. Fluid flow is permitted through line 840 in the direction of arrow 838, but the check valve 842 prevents fluid flow through the line 840 in the direction of arrow 839. When hydraulic fluid is flowing through line 812 in the direction of arrow 838, the hydraulic fluid flow through the line 840, bypassing the normally closed pressure relief valve 832.

The pressure relief valve 830 senses hydraulic pressure in line 812 via a line 840. When the hydraulic pressure in line 812, as communicated by line 844, reaches or exceeds a selected pressure, the hydraulic pressure causes the pressure relief valve 830 to open, allowing hydraulic fluid that is otherwise prevented from flowing through line 834 as a result of the check valve 836 to flow through the pressure relief valve 830 in the direction of arrow 839. Operation of the pressure relief valve 830 in this manner may result when the valve 814 is in the second position such that hydraulic fluid from the pump 802 is directed to line 812 and to the second end 822 of the first actuator 820. When operating in this manner, if the hydraulic pressure in line 812 exceeds a selected pressure, the hydraulic pressure, as communicated via line 844, causes the pressure relief valve 830 to open, allowing hydraulic fluid to flow through the pressure relief valve 830 in the direction of arrow 839 to flow to the sump 826. As a result, hydraulic fluid is allowed to flow out from the first end 818 of the first actuator 820 and to sump 826. As a result, a risk of damage to the hydraulic system 800 as a result of excessive pressures is reduced or eliminated.

The pressure relief valve 832 operates in a similar manner as the pressure relief valve 830. Hydraulic pressure in line 808 is communicated to the pressure relief valve 832 via a line 846. When the hydraulic pressure in line 808, as communicated by line 846, reaches or exceeds a selected pressure, the hydraulic pressure causes the pressure relief valve 832 to open, allowing hydraulic fluid that is otherwise prevented from flowing through line 840 as a result of the check valve 842 to flow through the pressure relief valve 832 in the direction of arrow 839. Operation of the pressure relief valve 832 in this manner may result when the valve 814 is in the first position such that hydraulic fluid from the pump 802 is directed to line 808 and to the first end 818 of the first actuator 820. When operating in this manner, if the hydraulic pressure in line 808 exceeds a selected pressure, the hydraulic pressure, as communicated via line 846, causes the pressure relief valve 832 to open, allowing hydraulic fluid to flow through the pressure relief valve 832 in the direction of arrow 839 to flow to the sump 826. As a result, hydraulic fluid is allowed to flow out from the second end 822 of the first actuator 820 and to sump 826. Consequently, a risk of damage to the hydraulic system 800 as a result of excessive pressures is reduced or eliminated.

The first actuator 820 is coupled to ends of the lines 808 and 812. The first actuator 820 may be similar to actuator 322 and includes a rod portion 848 and a body portion 850. The first actuator 820 is coupled to a gauge wheel, and operation of the first actuator 820 causes the gauge wheel to selectively extend and retract. The body portion 850 includes the first end 818 and the second end 822. Hydraulic fluid introduced at the first end 818 causes the rod portion 830 to extend, which, in turn, causes the gauge wheel to extend. Alternately, introduction of hydraulic fluid at the second end 822 causes the rod portion 830 to retract, which, in turn, causes the gauge wheel to retract. Moving the valve 814 to the first position so that the first portion 814 aligns with the lines 808 and 812 results in delivery of pressurized hydraulic fluid to the first end 818 of the actuator 820. In response, the rod portion 850 extends, which, in turn, extends the gauge wheel. Moving the valve 814 to the second position so that the second portion 824 aligns with the lines 808 and 812 results in delivery of pressurized hydraulic fluid to the second end 822 of the first actuator 820. As a result, the rod portion 850 is retracted, which causes retraction of the gauge wheel.

A line 852 extends from line 808 and is in fluid communication therewith. In some implementations, a check valve 854 is disposed in the line 852. The check valve 852 permits fluid flow in the direction of arrow 856 through line 852 but prevents fluid flow through line 852 in the direction of arrow 858. The line 852 extends to a valve 860. In the illustrated example, the valve 860 is a two-position, pressure operated valve that reacts to fluid pressure in line 812. Hydraulic fluid pressure is communicated to the valve 860 via a line 862 extending from the line 812. A line 864 extends from the valve 860 to a first end 866 of a second actuator 868. The valve 860 is biased by spring 867 that biases the valve 860 in a first position in which hydraulic fluid from the line 852 is directed to the first end 866 of the second actuator 868. The valve 860 is displaced into a second position, in which the line 864 is in fluid communication with a sump 869, when a pressure within line 812 reaches a selected pressure. When the valve 860 is moved to the second position, hydraulic fluid is allowed to flow from the second actuator 868 to the sump 869. In some implementations, the sumps 804, 826, and 869 are the same sump. The selected pressure at which valve 860 is displaced may be selected or altered by altering a spring constant of the spring 867. In this way, a pressure that displaces the valve 860 from the first position to the second position can be altered.

Although hydraulically driven pilot pressure valve 860 and electrical solenoid-operated valve 814 are illustrated, other types of directional control valves can be used and are within the scope of the present disclosure. For example, one or more check valves, three-way valves, four-way valves (regardless of the manner of operation, whether electrical or fluidically operated pilot valves), shuttle valves (regardless of the manner of operation, whether electrical or fluidically operated pilot valves), or a combination thereof are within the scope of the present disclosure. Further, manually operated valves are also within the scope of the present disclosure.

Various examples of flow control valves are also described herein, such as valves 807, 810, 832, and 830, 860, 1102 (described in more detail below), and 1203 (also described in more detail below). However, other types of flow control valves can be used and are within the scope of the present disclosure. For example, one or more gate valves, globe valves, pinch valves, diaphragm valves, needle valves, or a combination thereof can be used.

In the illustrated example, the second actuator 868 is a single-acting hydraulic cylinder. In other implementations, other types of actuators can be used, as described below. The second actuator 868 includes a rod portion 870, a body portion 872, and a spring 874. The rod portion 870 is extendable from and retractable into the body portion 872. The spring 874 biases the rod portion 870 towards a retracted position.

The hydraulic system 800 also includes the controller 828. In some implementations, the controller 828 forms or includes a computer system, such as the computer system 1300, described in more detail below. Additional details of the controller 828, such as processor 876 and memory 878, are described below in the context of computer system 1300. The controller 828 is operable to control the hydraulic system 800 and, particularly, to control operation of the gauge wheels along with corresponding positioning of the cutterbar of a header.

The controller 828 includes the processor 876 that is communicatively coupled to the memory 878. The memory 878 communicates with the processor 876 and is used to store programs and other software, information, and data. The processor 876 is operable to execute programs and software and receive information from and send information to the memory 878. Although a single memory 878 and a single processor 876 are illustrated, in other implementations, a plurality of memories, processors, or both may be used. Although the processor 876 and the memory 878 are shown as being local components of the controller 828, in other implementations, one or both of the processor 876 and memory 878 may be located remotely. Software 880, such as in the form of an application or program, is executed by the processor 876 to control operation of the hydraulic system 800, as described in more detail below.

In the illustrated example, the hydraulic system 800 also includes an input device 882 used to provide input into the controller 828. The input device 882 is communicably coupled via a wired or wireless connection. In some instances, the input device 882 is a touch screen display that is communicably coupled to the controller 828. The touch screen display is operable to display information, such as information associated with the hydraulic system 800. Further, a user can physically interact with the touch screen display, such as by touching a screen of the touch screen display, to provide input into the controller 828. In some instances, the user interacts with the touch screen display via a graphical user interface (GUI) to provide input to the controller 828. GUIs included within the scope of the present disclosure are described in more detail below. In some instances, a separate display is communicably coupled to the controller 828 to output information to a user. Other types of input devices within the scope of the present disclosure include a keyboard, a mouse, or a joystick and are described in more detail below. In some implementations, a display 884 is communicably coupled to the controller 828 and is used, for example, to output information to a user.

The hydraulic system 800 also includes a first pressure sensor 886 that senses a pressure in line 808 and a second pressure sensor 888 that senses a pressure in line 812. Signals generated by the first and second pressure sensors 886 and 888 are transmitted to the controller 828 and utilized by the software 880. For example, in some implementations, the pressure signals provided by the first and second pressure sensors 886 and 888 are used to determine when to actuate the valve 814 from the first position or the second position to the third position when a pressure within line 808 or line 812 reaches a selected value, as explained earlier. In some implementations, the controller 828 is also communicably coupled to the pump 802 to control operation thereof.

In operation, a user interacts with the input device 882 to control extension and retraction of the gauge wheels and, as a result, the configuration of the cutterbar. For example, a user uses the input device 882 to extend the gauge wheels. As a result, the controller 828, by operation of the software 880, sends a signal to the valve 814 that causes the valve 814 to move in the direction of arrow 890 into the first position in which the first portion 816 of the valve 814 is in fluid communication with lines 808 and 812. With the valve 814 in this position, pressurized hydraulic fluid is conducted from the pump 802, through line 808, and into the first end 818 of the first actuator 820. The hydraulic pressure extends the rod portion 850 of the first actuator 820, causing the gauge wheel to extend. As the rod portion 850 extends, hydraulic fluid is expelled from the second end 822 of the first actuator 820, causing hydraulic fluid to pass through line 812, through the first portion 816 of the valve 814, and to the sump 826. At the same time, the pressurized hydraulic fluid is communicated through the line 852, valve 860, and into the first end 866 of the second actuator 868. As a result, the rod portion 870 extends from the body portion 872 of the second actuator 868, causing the cutterbar to move into a rigid configuration.

For example, the second actuator 868 may be arranged on a header as shown in FIG. 3. In such instances, the second actuator is coupled to an arm, such as arm 320, that is attached to a lockout shaft, such as lockout shaft 314. Extension of the rod portion 870 causes rotation of the lockout tube and pivoting of the float arms and, consequently, movement of the cutterbar into a rigid configuration, as described above. Thus, the hydraulic fluid pressure used to extend the gauge wheels is also used, at the same time, to move the cutterbar into the rigid configuration. As a result, movement of the gauge wheels and the cutterbar (e.g., via the float arms) is accomplished by a single input, actionable from a cab of an agricultural vehicle, for example.

Similarly, a user is also able to retract the gauge wheels of a header while also placing the cutterbar into a flexible configuration with a single input. For example, a user interacts with the input device 882 to retract the gauge wheels. The controller 828 receives the input to retract the gauge wheels and sends a signal to the valve 814 to place the valve 814 into the second position, for example by movement of the valve 814 in the direction of arrow 892. In the second position, the second portion 824 of valve 814 is in fluid communication with lines 808 and 812. Pressurized fluid is directed from line 808 through the second portion 824 of valve 814 and into line 812. Consequently, the pressurized fluid is directed to the second end 822 of the first actuator 820, causing the rod portion 850 retract into the body portion 848. As a result, the gauge wheels are retracted. As the rod portion 850 is retracted, hydraulic fluid is expelled from the first end 818 of the first actuator 820, causing hydraulic fluid to pass through line 808, through the second portion 824 of the valve 814, and to the sump 826. At the same time, the hydraulic pressure resident in the line 812 is communicated to the valve 860 via the line 862. When the hydraulic pressure reaches a selected pressure, the hydraulic pressure overcomes the spring force exerted by spring 867, causing the valve 860 to move to a second position. In the second position, the valve 860 defines a path for fluid flow from the first end 866 of the second actuator 868, through the valve 860, and into the sump 869.

Prior to displacement of the valve 860 into the second position, hydraulic fluid from the second actuator 868 is prevented from passing through the valve 860 and line 852 by the check valve 854 that prevents fluid flow through line 852 in the direction of arrow 858. When the valve 860 moves into the second position, the spring 874 causes the rod portion 870 to retract, expelling hydraulic fluid from the first end 866 of the second actuator 868 and allowing hydraulic fluid to flow through the valve 860 and to the sump 869. Retraction of the rod portion 870 moves the cutterbar into the flexible configuration. For example, referring to FIG. 3, the rod portion 870 rotates a lockout shaft, such as lockout shaft 314, causing the float arms to pivot, and placing the float arms and cutterbar into the flexible configuration.

The pressure at which the valve 860 is moved from the first position to the second position, thereby moving the cutterbar into the flexible configuration, is described as a cracking pressure. The spring 867 (e.g., a spring constant of the spring 867) can be selected such that the valve 860 is displaced at a desired pressure. For example, in some implementations, the spring 867 is selected such that displacement of the valve 860 occurs at a fluid pressure corresponding to a position of the gauge wheels at approximately a 15 percent retraction of the gauge wheel. In some instances, the percentage of retraction represents an amount of movement of the gauge wheels over a total range of available retraction movement of the gauge wheels. Thus, in some implementations, the cutterbar remains in a rigid configuration even though the gauge wheels have been retracted by a selected amount. However, an amount of retraction of the gauge wheel at which the valve 860 is moved from the first position to the second position may be greater than or less than 15 percent. For example, in some instances, an amount of retraction of the gauge wheels at which the valve 860 is moved is less than 15 percent. In other instances, an amount of retraction of the gauge wheels at which the valve 860 is moved is greater than 15 percent.

Still further, in some implementations, the hydraulic system 800 operates to delay actuation of the cutterbar into the rigid configuration until the gauge wheels have extended by a selected amount. For example, in some instances, movement of the valve 860 from the second position to the first position to cause the cutterbar (e.g., via movement of the float arms) to move into the rigid configuration occurs when the gauge wheels reach a position of approximately 15 percent of extension. In some instances, the percentage of extension represents an amount of movement of the gauge wheels over a total range of available extension movement of the gauge wheels. For example, a biasing force provided by spring 874 can be selected such that extension of the rod portion 870 until a hydraulic pressure reaches a selected pressure. The selected pressure may be associated with a selected amount of extension of the gauge wheel. For example, the spring force provided by the spring 874 may be overcome when a hydraulic pressure associated with a 15 percent extension of the gauge wheels is reached. At that point, the second actuator 868 begins to extend to move the cutterbar into the rigid configuration.

Figure 9:
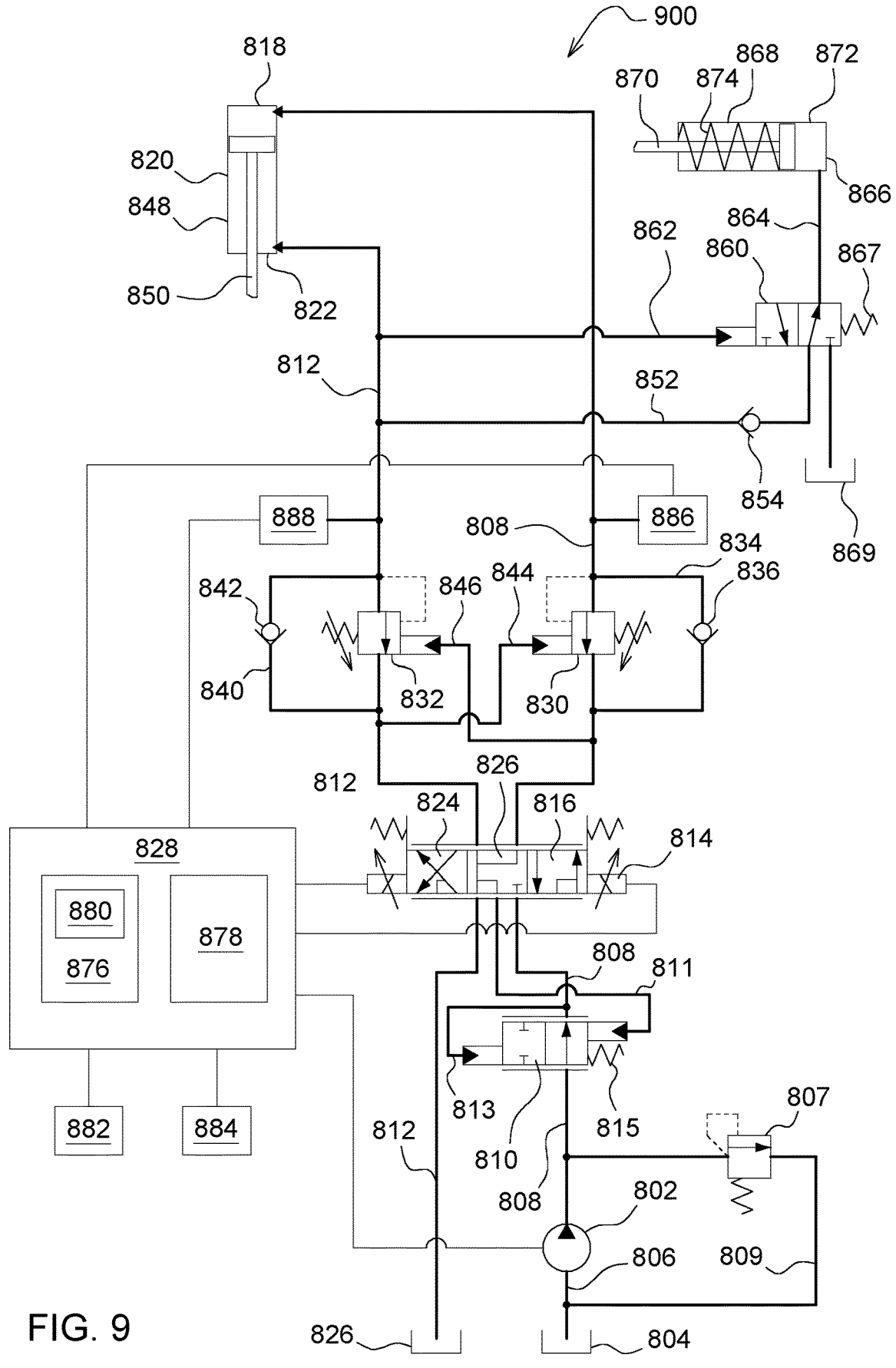
FIG. 9 is a schematic view of example hydraulic system, according to some implementations of the present disclosure.

FIG. 9 is a schematic view of another example hydraulic system 900. The hydraulic system 900 is identical to the hydraulic system 800 except that the line 852 extends and is in fluid communication with the line 812. Consequently, as hydraulic pressure is applied at the first end 818 of the actuator 820 in response to placing the valve 814 in the first position such that the first portion 816 of the valve 814 is in communication with the lines 808 and 812, the rod portion 850 of the actuator extends and hydraulic fluid is forced out of the second end 822 of the actuator 820. The hydraulic fluid expelled from the second end 822 of the actuator 820 pressurizes the fluid in lines 812 and 852, which, in turn, causes the piston portion 870 of the second actuator 868 to extend. Extension of the second actuator 868, for example, rotates float arms to place a cutterbar into a rigid configuration. Therefore, extension of the first actuator 820 in response to applied fluid pressure at the first end 818 of the first actuator 820 extends the gauge wheel while simultaneously causing the cutterbar to be moved into the rigid configuration.

The pressure of the hydraulic fluid expelled from the second end 822 of the first actuator 820 (and, thus, the hydraulic pressure in the line 812) is below a selected pressure that displaces the valve 860 from the first position to the second position. The selected pressure can be defined by, for example, selecting a spring constant of the spring 867. Further, as also described earlier, the selected pressure can be defined so that the cutter moves into the flexible configuration when the gauge wheels have reached a selected amount of retraction, such as 15 percent of retraction. As also explained above, the amount of movement of the gauge wheels at which the valve 860 moves to the second position may be any amount of retraction of the gauge wheels.

With continued reference to FIG. 9, when the valve 814 moves to the second position in which the second portion 824 is in fluid communication with the lines 808 and 812, hydraulic pressure, via the hydraulic fluid, is applied to the second end 822 of the first actuator 820, causing the rod portion 850 to be retracted into the body portion 848. The pressurized hydraulic fluid in line 812 used to move the rod portion 850 also pressurizes lines 852 and 862. Generally, the hydraulic pressure in line 812 used to operate the first actuator 820 exceeds the selected pressure that causes the valve 860 to move from the first position to the second position. Therefore, although the hydraulic pressure in line 812 also pressurizes line 852, tending to cause the rod portion 870 of the second actuator 868 to extend, the fluid pressure is greater than the force exerted by the spring 867, causing displacement of the valve 860 from the first position to the second position. In this configuration, the valve 860 prevents passage of hydraulic fluid and pressure to the second actuator 868 while also providing fluid communication between the first end 866 of the second actuator 868 and the sump 869. Consequently, hydraulic fluid is permitted to flow between the second end 866 of the second actuator 868 and the sump. In response, the spring 874 retracts the rod portion 870 relative to the body portion 872, expelling hydraulic fluid from the first end 866 of the second actuator 868. Retraction of the rod portion 850 expels hydraulic fluid from the first end 818 of the first actuator 820, and hydraulic fluid is permitted to flow through line 808, through the second portion 824 of the valve 814, and to the sump 826. In other implementations, the spring 874 is omitted, and the weight of the cutterbar, float arms, or both causes the cutterbar and float arms to return to the flexible configuration when hydraulic pressure is removed from the first end 866 of the actuator 868.

As a result, the cutterbar is maintained in a rigid configuration during a portion of the retraction of the gauge wheels. In some implementations, displacement of the valve 860 occurs at a fluid pressure corresponding to a position of the gauge wheels at approximately a 15 percent retraction of the gauge wheel. In other implementations, the amount of retraction of the gauge wheels at which the cutterbar is moved from the rigid configuration to the flexible configuration may be selected to be any amount of retraction of the gauge wheels.

Figure 10:
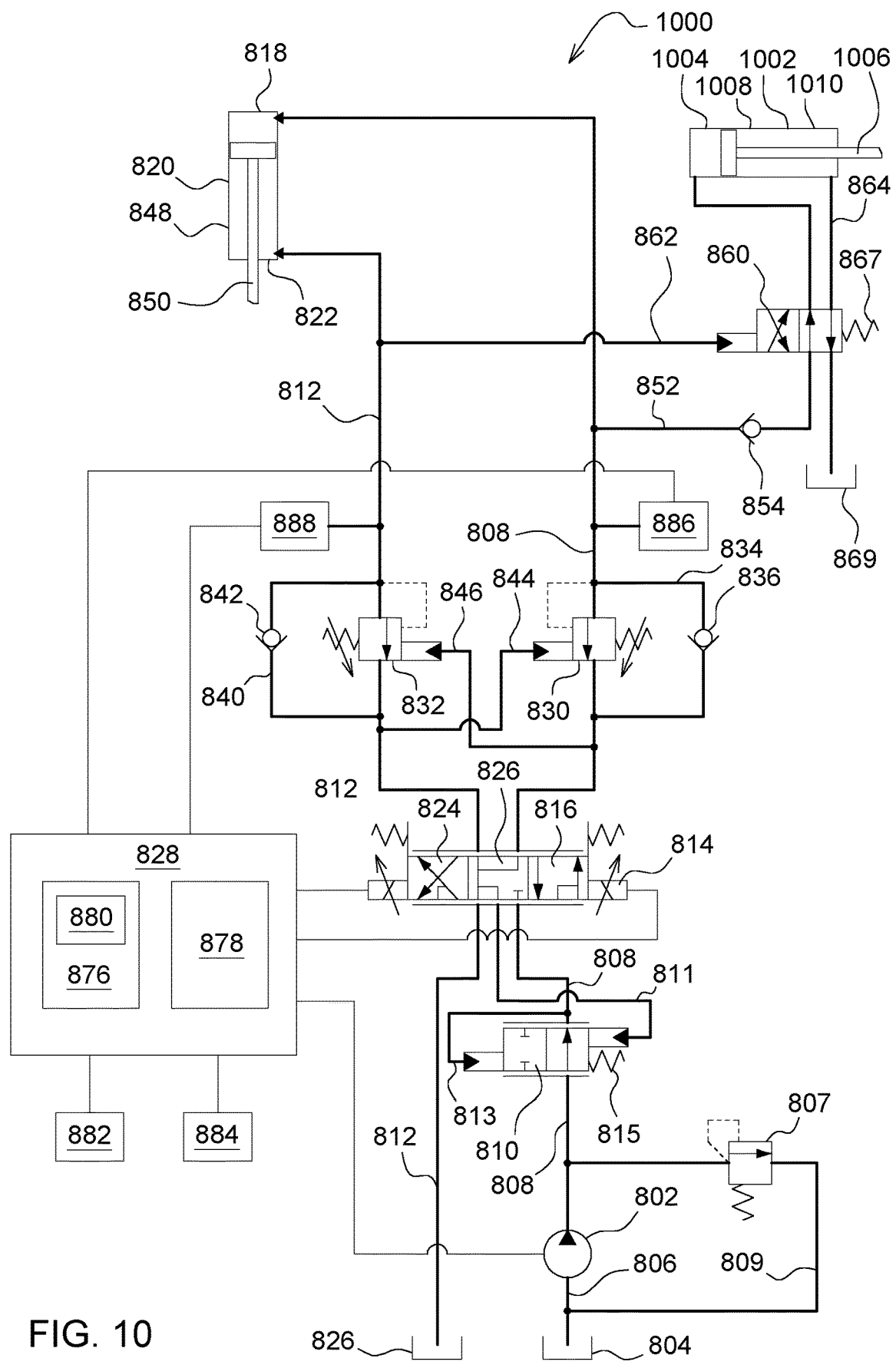
FIG. 10 is a schematic view of another example hydraulic system, according to some implementations of the present disclosure.

Further, in some implementations, the hydraulic system 900 operates to delay actuation of the cutterbar into the rigid configuration until the gauge wheels have extended by a selected amount. For example, in some instances, movement of the valve 860 from the second position to the first position to cause the cutterbar (e.g., via movement of the float arms) to move into the flexible configuration occurs when the gauge wheels reach a position of approximately 15 percent of retraction. In some instances, the percentage of retraction represents an amount of movement of the gauge wheels over a total range of available retraction movement of the gauge wheels. For example, a biasing force provided by spring 874 can be selected such that extension of the rod portion 870 is delayed until a hydraulic pressure reaches a selected pressure. The selected pressure may be associated with a selected amount of extension of the gauge wheel. For example, the spring force provided by the spring 874 may be overcome when a hydraulic pressure associated with a 15 percent extension of the gauge wheels is reached. At that point, the second actuator 868 begins to extend to move the cutterbar into the rigid configuration Another example hydraulic system is shown in FIG. 10. FIG. 10 is a schematic view of hydraulic system 1000 that is similar to the hydraulic system 800 except that the second actuator 1002 is a dual action actuator, thereby omitting a spring (e.g., spring 874) that biases the rod portion 870 towards a retracted position. When the valve 814 is in the first position in which the first portion 816 is in fluid communication with line 808 and 812, hydraulic fluid is directed from pump 802 through the first portion 816 of the valve 814, through line 808, and to the first end 818 of the first actuator 820, as described earlier. The hydraulic fluid in line 808 also pressurizes line 852. Valve 860 permits passage of the hydraulic fluid to a first end 1004 of the second actuator 1002. As a result, a rod portion 1006 of the second actuator 1002 extends relative to a body portion 1008 of the second actuator 1002. Extension of the rod portion 1006 causes hydraulic fluid to be expelled from a second end 1010 of the second actuator 1002. The expelled hydraulic fluid is permitted to flow through line 864, through valve 860, and into the sump 869.

When the valve 814 is moved to the second position such that the second portion 824 is in fluid communication with the lines 808 and 812, hydraulic fluid is communicated from the pump 802 through line 808, though the second portion 824 of the valve 814, through line 812, and into the second end 822 of the first actuator. The hydraulic pressure of the hydraulic fluid is applied to the valve 860 via line 862. Generally, the hydraulic pressure within line 812 when the valve 814 is in the second position exceed the biasing force applied by spring 867. Consequently, the valve 860 moves from the first position to the second position in which fluid communication is provided between the line 852 and the second end 1010 of the second actuator 1002. Further, hydraulic fluid expelled from the first end 818 of the first actuator 820 in response to retraction of the rod portion 850 caused by the hydraulic pressure applied at the second end 822 of the first actuator 820 pressurizes line 852. Hydraulic pressure within line 852 is transmitted through valve 860 and to the second end 1010 of the second actuator 1002. In response, the rod portion 1006 is retracted relative to the body portion 1008, expelling hydraulic fluid from the first end 1004 of the second actuator 1008. Hydraulic fluid is permitted to flow from the first end 1004, though the valve 860, and to the sump 869. Consequently, hydraulic pressure used to extend the gauge wheels in response to extension of the first actuator 820 also causes movement of the cutterbar into a rigid configuration as a result of extension of the second actuator 1002. Similarly, the hydraulic pressure used to retract the gauge wheels is also used to move the cutterbar into the flexible configuration.

The actuators, such as actuators 820 and 868, are described herein as hydraulic cylinders. Thus, in some implementations, the actuators are linear hydraulic cylinders. However, other types of actuators are within the scope of the present disclosure. For example, in some implementations, a hydraulic motor is used to actuate the gauge wheels or the cutterbar. The hydraulic motor receives a flow of pressurized hydraulic fluid to generate rotational motion.

In some implementations, the rotational motion is used to drive a shaft that is used to extend and retract the gauge wheels or move a cutterbar between a flexible configuration or a rigid configuration, such as by pivoting float arms to which the cutterbar is coupled. Example hydraulic motors include unidirectional hydraulic motors and bidirectional hydraulic motors.

Figure 11:
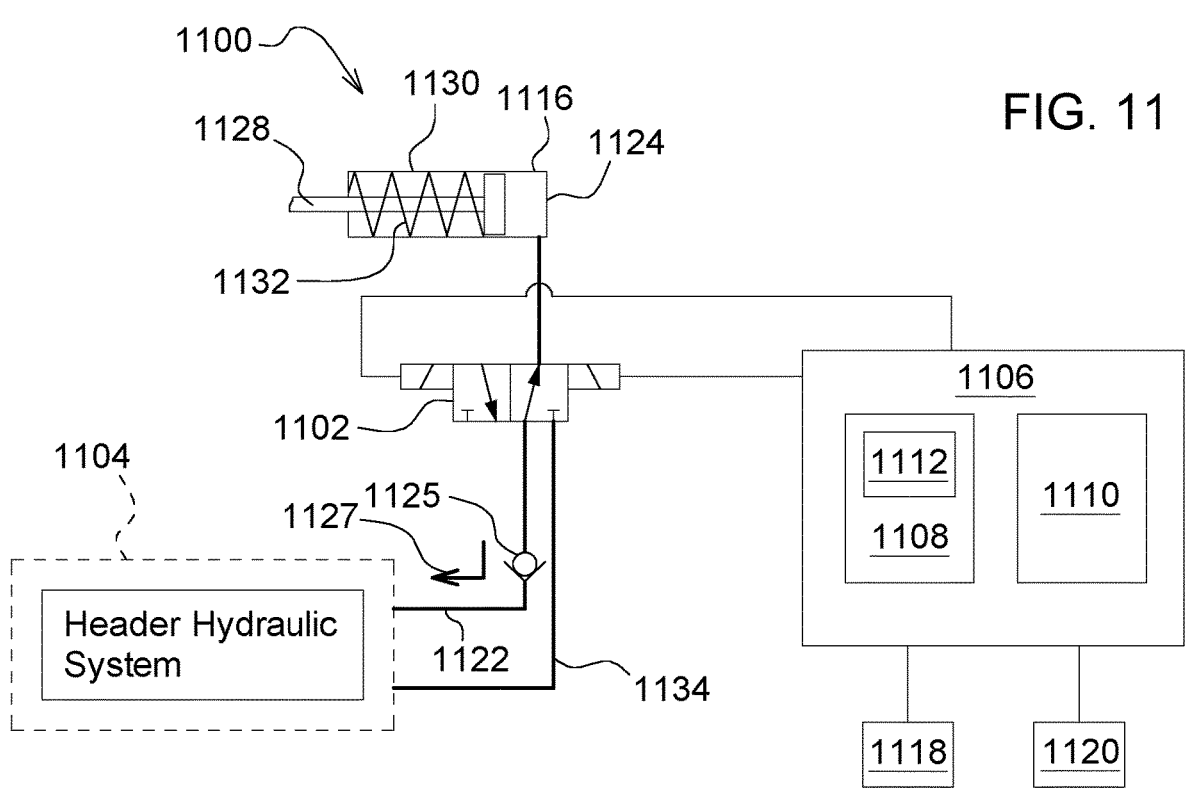
FIG. 11 is a schematic view of another example hydraulic system, according to some implementations of the present disclosure.

Some headers, e.g., some draper headers, do not include gauge wheels. Therefore, altering a configuration of the cutterbar with actuation of a gauge wheel is not possible. This problem is solved, however, by linking a hydraulic system of a header, which may be used to provide suspension to the wings of a header (such as wings 116 and 118) as the wings are displaced during an agricultural operation. FIG. 11 shows a schematic of an example hydraulic system 1100 in which a valve 1102 is coupled to a header hydraulic system 1104. In the illustrated example, the valve 1102 is a two-position, solenoid operated valve. Other types of valve may also be used, such as a proportional valve. The system 1100 also includes a controller 1106. The controller 1106 may be a computer system, such as computer system 1300, and may be similar to controller 828. The controller 1106 includes at least one processor 1108 and at least one memory 1110. The processor 1108 may be similar to the processor 876, and the memory 1110 may be similar to the memory 878. Software 1112 is executed by the processor 1108 to control the valve 1102 used to control operation of an actuator 1116. The actuator 1116 operated to alter a configuration of a cutterbar, such as cutterbar 132 or 216. In some implementations, the cutterbar is coupled to one or more float arms as described earlier. An input device 1118, which may be similar to input device 882, is coupled to the controller 1106 to provide input to the controller 1106. A display 1120, which may be similar to display 884, is also coupled to the controller 1106 to provide output to a user.

A user provides input to the input device 882 to move the cutterbar between a rigid configuration and a flexible configuration. When the rigid configuration of the cutterbar is selected, the controller 1106, which is communicably coupled to the valve 1102, e.g., wired or wirelessly, sends a signal to the valve 1102, moving the valve 1102 from to a first position, shown in FIG. 11, in which hydraulic fluid is permitted to flow from a first line 1122, through valve 1102, and to a first end 1124 of an actuator 1116. A one-way valve 1125 is disposed in the first line 1122 to prevent flow of hydraulic fluid in the direction of arrow 1127. Hydraulic pressure of the hydraulic fluid causes a rod portion 1128 of the actuator 1116 to extend relative to a body portion 1130 of the actuator 1116. In some implementations, extension of the rod portion 1128 causes one or more float arms to pivot, as described earlier, to move the cutterbar into the rigid configuration. In the illustrated example, the actuator 1116 includes a spring 1132. The rod portion 1128 extends when the hydraulic pressure exceeds a biasing force provide by the spring 1132.

When the flexible configuration is desired, the controller sends a signal to the valve 1102 to move the valve into a second position in which hydraulic fluid from the first line 1122 is prevented from passing through the valve 1102, and a passage is provided through the valve 1102 from the first end 1124 of the actuator 1116 to a second line 1134. The generated passage allows hydraulic fluid to pass through the second line 1134 from the actuator 1116 back to the header hydraulic system 1104. With the hydraulic pressure from the first line 1122 removed, the biasing force provided by the spring 1132 causes the rod portion 1128 to retract, expelling hydraulic fluid from the first end 1124 of the actuator 1116.

As a result of retraction of the rod portion 1128, the cutterbar is returned to the flexible configuration, such as by pivoting of one or more float arms as described earlier.

Figure 12:
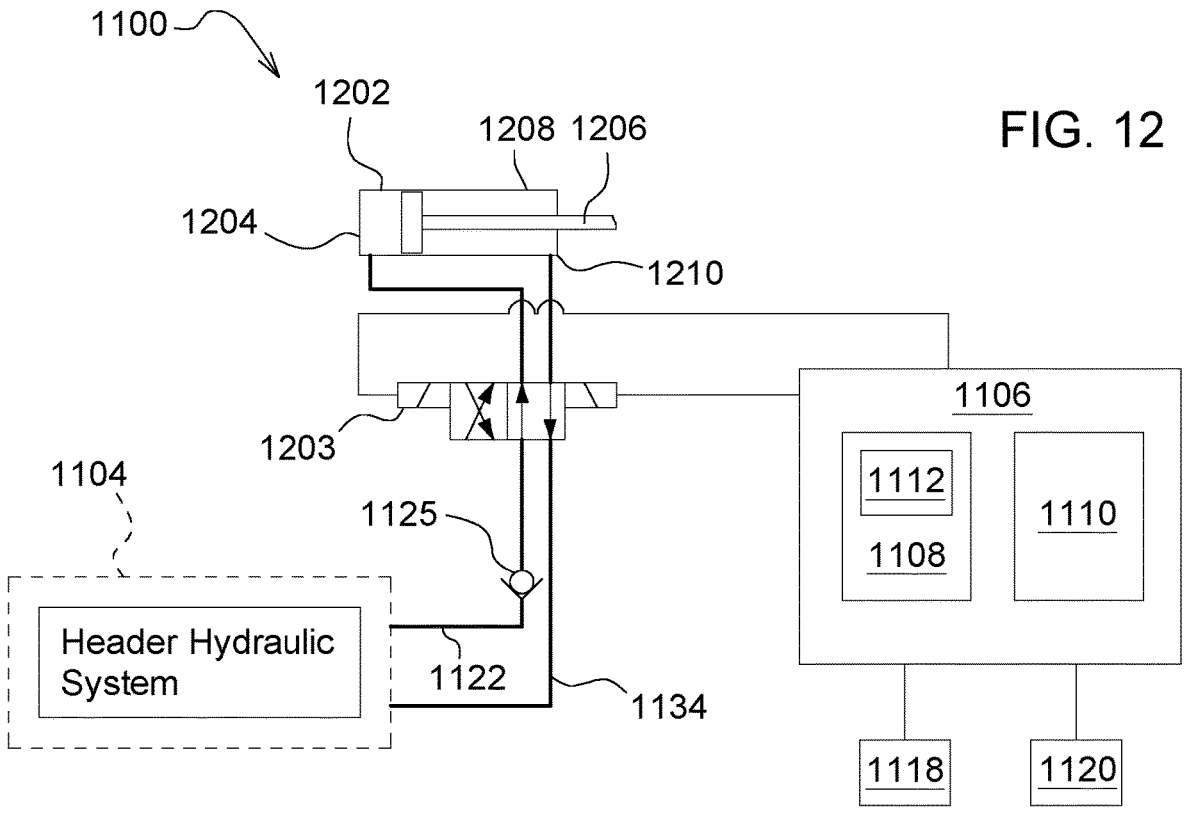
FIG. 12 is a schematic view of another example hydraulic system, according to some implementations of the present disclosure.

FIG. 12 is a schematic of another example hydraulic system 1200. The hydraulic system 1200 is identical to the hydraulic system 1100 except that the actuator 1202 is a dual-acting hydraulic cylinder, as opposed to a single-acting hydraulic cylinder, such as actuator 1116. A valve 1203 of the system 1200 also varies from the system 1100. The valve 1203 provides for fluid flow in two directions in both a first and second position. Thus, when a valve 1203 is in the first position (as shown in FIG. 12), hydraulic fluid is permitted to flow from the first line 1122, through the valve 1203, and to a first end 1204 of the actuator 1102. Hydraulic pressure of the hydraulic fluid causes a rod portion 1206 of the actuator 1202 to extend relative to a body portion 1208 of the actuator 1202. Extension of the rod portion 1206 expels hydraulic fluid from a second end 1210 of the actuator 1202, and the valve 1102 conducts hydraulic fluid from the second end 1210 of the actuator to the second line 1134, and back to the header hydraulic system 1104. With the rod portion 1206 extended, the actuator 1202 moves the cutterbar into the rigid configuration, such as by rotating one or more float arms coupled to the cutterbar.

With the valve 1203 in the second position, hydraulic fluid from the header hydraulic system 1104 is directed from the first line 1122, through the valve 1203, and to the second end 1210 of the actuator 1202. The hydraulic pressure of this hydraulic fluid retracts the rod portion 1206, causing hydraulic fluid to be expelled from the first end 1204 of the actuator 1202. The valve 1203 provides a fluid path between the first end 1204, through the valve 1203, and to the second line 1134, allowing hydraulic fluid to return to the header hydraulic system 1104. In this way, the cutterbar is moved into the flexible configuration, such as by rotation of one or more float arms coupled to the cutterbar.

Without in any way limiting the scope, interpretation, or application of the claims appearing below, a technical effect of one or more of the example implementations disclosed herein is to link alteration of a configuration of a cutterbar with operation of the gauge wheels of a header. Particularly, altering the configuration of the cutterbar is automatically performed in response to operation of the gauge wheels. Another technical effect of one or more of the example implementations disclosed herein is providing the ability to alter the cutterbar in response to operation of the gauge wheels from a cab of a vehicle. That is, the operator is able to both extend or retract the gauge wheels while, at the same time, configuring the cutterbar in a rigid or flexible configuration using in-cab controls, thus avoiding the need to exit a vehicle cab. Consequently, the time associated with operation of the cutterbar is reduced. Another technical effect of one or more of the example implementations disclosed herein is maintaining a cutterbar in a particular configuration for a selected amount of movement of the gauge wheels prior to reconfiguration of the cutterbar in response to movement of the gauge wheels.

Figure 13:
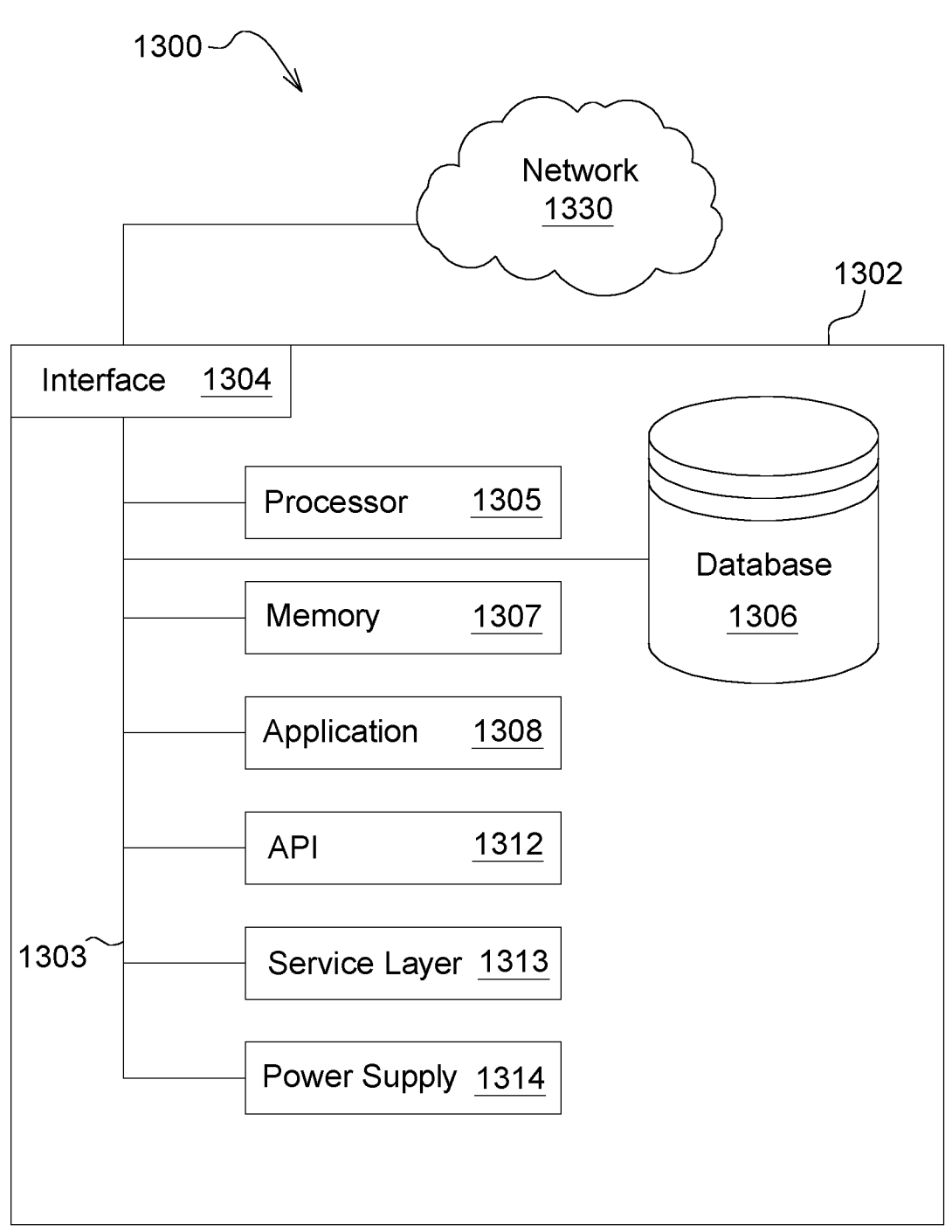
FIG. 13 is a block diagram illustrating an example computer system used to provide computational functionalities associated with described algorithms, methods, functions, processes, flows, and procedures as described in the present disclosure, according to some implementations of the present disclosure.

FIG. 13 is a block diagram of an example computer system 1300 used to provide computational functionalities associated with described algorithms, methods, functions, processes, flows, and procedures described in the present disclosure, according to some implementations of the present disclosure. The illustrated computer 1302 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 1302 can include input devices such as keypads, keyboards, and touch screens that can accept user information. Also, the computer 1302 can include output devices that can convey information associated with the operation of the computer 1302. The information can include digital data, visual data, audio information, or a combination of information. The information can be presented in a graphical user interface (UI) (or GUI).

The computer 1302 can serve in a role as a client, a network component, a server, a database, a persistency, or components of a computer system for performing the subject matter described in the present disclosure. The illustrated computer 1302 is communicably coupled with a network 1330. In some implementations, one or more components of the computer 1302 can be configured to operate within different environments, including cloud-computing-based environments, local environments, global environments, and combinations of environments.

At a high level, the computer 1302 is an electronic computing device operable to receive, transmit, process, store, and manage data and information associated with the described subject matter. According to some implementations, the computer 1302 can also include, or be communicably coupled with, an application server, an email server, a web server, a caching server, a streaming data server, or a combination of servers.

The computer 1302 can receive requests over network 1330 from a client application (for example, executing on another computer 1302). The computer 1302 can respond to the received requests by processing the received requests using software applications. Requests can also be sent to the computer 1302 from internal users (for example, from a command console), external (or third) parties, automated applications, entities, individuals, systems, and computers.

Each of the components of the computer 1302 can communicate using a system bus 1303. In some implementations, any or all of the components of the computer 1302, including hardware or software components, can interface with each other or the interface 1304 (or a combination of both), over the system bus 1303. Interfaces can use an application programming interface (API) 1312, a service layer 1313, or a combination of the API 1312 and service layer 1313. The API 1312 can include specifications for routines, data structures, and object classes. The API 1312 can be either computer-language independent or dependent. The API 1312 can refer to a complete interface, a single function, or a set of APIs.

The service layer 1313 can provide software services to the computer 1302 and other components (whether illustrated or not) that are communicably coupled to the computer 1302. The functionality of the computer 1302 can be accessible for all service consumers using this service layer. Software services, such as those provided by the service layer 1313, can provide reusable, defined functionalities through a defined interface. For example, the interface can be software written in JAVA, C++, or a language providing data in extensible markup language (XML) format. While illustrated as an integrated component of the computer 1302, in alternative implementations, the API 1312 or the service layer 1313 can be stand-alone components in relation to other components of the computer 1302 and other components communicably coupled to the computer 1302. Moreover, any or all parts of the API 1312 or the service layer 1313 can be implemented as child or sub-modules of another software module, enterprise application, or hardware module without departing from the scope of the present disclosure.

The computer 1302 includes an interface 1304. Although illustrated as a single interface 1304 in FIG. 13, two or more interfaces 1304 can be used according to particular needs, desires, or particular implementations of the computer 1302 and the described functionality. The interface 1304 can be used by the computer 1302 for communicating with other systems that are connected to the network 1330 (whether illustrated or not) in a distributed environment. Generally, the interface 1304 can include, or be implemented using, logic encoded in software or hardware (or a combination of software and hardware) operable to communicate with the network 1330. More specifically, the interface 1304 can include software supporting one or more communication protocols associated with communications. As such, the network 1330 or the interface's hardware can be operable to communicate physical signals within and outside of the illustrated computer 1302.

The computer 1302 includes a processor 1305. Although illustrated as a single processor 1305 in FIG. 13, two or more processors 1305 can be used according to particular needs, desires, or particular implementations of the computer 1302 and the described functionality. Generally, the processor 1305 can execute instructions and can manipulate data to perform the operations of the computer 1302, including operations using algorithms, methods, functions, processes, flows, and procedures as described in the present disclosure.

The computer 1302 also includes a database 1306 that can hold data for the computer 1302 and other components connected to the network 1330 (whether illustrated or not). For example, database 1306 can be an in-memory, conventional, or a database storing data consistent with the present disclosure. In some implementations, database 1306 can be a combination of two or more different database types (for example, hybrid in-memory and conventional databases) according to particular needs, desires, or particular implementations of the computer 1302 and the described functionality. Although illustrated as a single database 1306 in FIG. 13, two or more databases (of the same, different, or combination of types) can be used according to particular needs, desires, or particular implementations of the computer 1302 and the described functionality. While database 1306 is illustrated as an internal component of the computer 1302, in alternative implementations, database 1306 can be external to the computer 1302.

The computer 1302 also includes a memory 1307 that can hold data for the computer 1302 or a combination of components connected to the network 1330 (whether illustrated or not). Memory 1307 can store any data consistent with the present disclosure. In some implementations, memory 1307 can be a combination of two or more different types of memory (for example, a combination of semiconductor and magnetic storage) according to particular needs, desires, or particular implementations of the computer 1302 and the described functionality. Although illustrated as a single memory 1307 in FIG. 13, two or more memories 1307 (of the same, different, or combination of types) can be used according to particular needs, desires, or particular implementations of the computer 1302 and the described functionality. While memory 1307 is illustrated as an internal component of the computer 1302, in alternative implementations, memory 1307 can be external to the computer 1302.

The application 1308 can be an algorithmic software engine providing functionality according to particular needs, desires, or particular implementations of the computer 1302 and the described functionality. For example, application 1308 can serve as one or more components, modules, or applications. Further, although illustrated as a single application 1308, the application 1308 can be implemented as multiple applications 1308 on the computer 1302. In addition, although illustrated as internal to the computer 1302, in alternative implementations, the application 1308 can be external to the computer 1302.

The computer 1302 can also include a power supply 1314. The power supply 1314 can include a rechargeable or non-rechargeable battery that can be configured to be either user- or non-user-replaceable. In some implementations, the power supply 1314 can include power-conversion and management circuits, including recharging, standby, and power management functionalities. In some implementations, the power-supply 1314 can include a power plug to allow the computer 1302 to be plugged into a wall socket or a power source to, for example, power the computer 1302 or recharge a rechargeable battery.

There can be any number of computers 1302 associated with, or external to, a computer system containing computer 1302, with each computer 1302 communicating over network 1330. Further, the terms "client," "user," and other appropriate terminology can be used interchangeably, as appropriate, without departing from the scope of the present disclosure. Moreover, the present disclosure contemplates that many users can use one computer 1302 and one user can use multiple computers 1302.

Described implementations of the subject matter can include one or more features, alone or in combination.

For example, in a first implementation, a computer-implemented method of automatically configuring a cutterbar of an agricultural header includes pressurizing a fluid and one of moving a gauge wheel into an extended position and simultaneously moving a cutterbar into a rigid configuration and moving the gauge wheel into a retracted position and simultaneously moving the cutterbar into a flexible configuration in response to the pressurized fluid.

The foregoing and other described implementations can each, optionally, include one or more of the following features:

A first feature, combinable with any of the following features, wherein moving a gauge wheel into an extended position and simultaneously moving a cutterbar into a rigid configuration in response to the pressurize fluid includes actuating a first hydraulic cylinder to move the gauge wheel into the extended position in response to the pressurized fluid and simultaneously actuating a second hydraulic cylinder to move the cutterbar into the rigid configuration in response to the pressurized fluid.

A second feature, combinable with any of the previous or following features, wherein moving the gauge wheel into a retracted position while simultaneously moving the cutterbar into a flexible configuration in response to a pressurized fluid includes actuating a first hydraulic cylinder to move the gauge wheel into the retracted position in response to the pressurized fluid and actuating a valve when the pressurized fluid reaches a selected pressure, wherein actuation of the valve causes actuation of a second hydraulic cylinder to move the cutterbar into the flexible configuration.

A third feature, combinable with any of the previous or following features, wherein the valve is a pilot pressure valve and wherein actuating a valve when the pressurized fluid reaches a selected pressure includes transmitting the pressurized fluid to the pilot pressure valve via a pilot pressure line and actuating the pilot pressure valve with the pressurized fluid when the pressurized fluid reaches the selected pressure.

A fourth feature, combinable with any of the previous features, wherein actuating a valve when the pressurized fluid reaches a selected pressure includes sensing a pressure of the pressurized fluid with a pressure sensor and actuating the valve when the sensed pressure of the pressurized fluid reaches the selected pressure.

In a second implementation, a non-transitory, computer-readable medium storing one or more instructions executable by a computer system to perform operations including pressurizing a fluid and one of moving a gauge wheel into an extended position and simultaneously moving a cutterbar into a rigid configuration and moving the gauge wheel into a retracted position and simultaneously moving the cutterbar into a flexible configuration in response to the pressurized fluid.

The foregoing and other described implementations can each, optionally, include one or more of the following features:

A first feature, combinable with any of the following features, wherein moving a gauge wheel into an extended position and simultaneously moving a cutterbar into a rigid configuration in response to the pressurize fluid includes actuating a first hydraulic cylinder to move the gauge wheel into the extended position in response to the pressurized fluid and simultaneously actuating a second hydraulic cylinder to move the cutterbar into the rigid configuration in response to the pressurized fluid.

A second feature, combinable with any of the previous or following features, wherein moving the gauge wheel into a retracted position while simultaneously moving the cutterbar into a flexible configuration in response to a pressurized fluid includes actuating a first hydraulic cylinder to move the gauge wheel into the retracted position in response to the pressurized fluid and actuating a valve when the pressurized fluid reaches a selected pressure, wherein actuation of the valve causes actuation of a second hydraulic cylinder to move the cutterbar into the flexible configuration.

A third feature, combinable with any of the previous or following features, wherein the valve is a pilot pressure valve and wherein actuating a valve when the pressurized fluid reaches a selected pressure includes transmitting the pressurized fluid to the pilot pressure valve via a pilot pressure line and actuating the pilot pressure valve with the pressurized fluid when the pressurized fluid reaches the selected pressure.

A fourth feature, combinable with any of the previous features, wherein actuating a valve when the pressurized fluid reaches a selected pressure includes sensing a pressure of the pressurized fluid with a pressure sensor and actuating the valve when the sensed pressure of the pressurized fluid reaches the selected pressure.

In a third implementation, a computer-implemented system, including one or more processors and a non-transitory computer-readable storage medium coupled to the one or more processors and storing programming instructions for execution by the one or more processors, the programming instructions instructing the one or more processors to pressurize a fluid and one of to move a gauge wheel into an extended position and simultaneously moving a cutterbar into a rigid configuration and moving the gauge wheel into a retracted position and simultaneously to move the cutterbar into a flexible configuration in response to the pressurized fluid.

The foregoing and other described implementations can each, optionally, include one or more of the following features:

A first feature, combinable with any of the following features, wherein the programming instruction instructing the one or more processors to move a gauge wheel into an extended position and simultaneously to move a cutterbar into a rigid configuration in response to the pressurize fluid includes programming instructions instructing the one or more processors to actuate a first hydraulic cylinder to move the gauge wheel into the extended position in response to the pressurized fluid and simultaneously to actuate a second hydraulic cylinder to move the cutterbar into the rigid configuration in response to the pressurized fluid.

A second feature, combinable with any of the previous or following features, wherein the programming instructions instructing the one or more processors to move the gauge wheel into a retracted position while simultaneously moving the cutterbar into a flexible configuration in response to a pressurized fluid includes programming instructions instructing the one or more processors to actuate a first hydraulic cylinder to move the gauge wheel into the retracted position in response to the pressurized fluid and to actuate a valve when the pressurized fluid reaches a selected pressure, wherein actuation of the valve causes actuation of a second hydraulic cylinder to move the cutterbar into the flexible configuration.

A third feature, combinable with any of the previous or following features, wherein the valve is a pilot pressure and wherein the programming instructions instructing the one or more processors to actuate a valve when the pressurized fluid reaches a selected pressure includes programming instructions instructing the one or more processors to transmit the pressurized fluid to the pilot pressure valve via a pilot pressure line and actuate the pilot pressure valve with the pressurized fluid when the pressurized fluid reaches the selected pressure.

A fourth feature, combinable with any of the previous features, wherein the programming instructions instructing the one or more processors to actuate a valve when the pressurized fluid reaches a selected pressure includes programming instructions instructing the one or more processors to sense a pressure of the pressurized fluid with a pressure sensor and actuate the valve when the sensed pressure of the pressurized fluid reaches the selected pressure.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. The example, the signal can be a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatus, devices, and machines for processing data, including by way of example, a programmable processor, a computer, or multiple processors or computers. The apparatus can also include special purpose logic circuitry including, for example, a central processing unit (CPU), a field programmable gate array (FPGA), or an application-specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example, LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub-programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory. A computer can also include, or be operatively coupled to, one or more mass storage devices for storing data. In some implementations, a computer can receive data from, and transfer data to, the mass storage devices including, for example, magnetic, magneto-optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer-readable media (transitory or non-transitory, as appropriate) suitable for storing computer program instructions and data can include all forms of permanent/non-permanent and volatile/non-volatile memory, media, and memory devices. Computer-readable media can include, for example, semiconductor memory devices such as random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer-readable media can also include, for example, magnetic devices such as tape, cartridges, cassettes, and internal/removable disks. Computer-readable media can also include magneto-optical disks and optical memory devices and technologies including, for example, digital video disc (DVD), CD-ROM, DVD+/–R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated in, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that is used by the user. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

Wireless connections within the scope of the present disclosure include wireless protocols, such as, 802.15 protocols (e.g., a BLUETOOTH®), 802.11 protocols, 802.20 protocols (e.g., WI-FI®), or a combination of different wireless protocols.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

While the above describes example implementations of the present disclosure, these descriptions should not be viewed in a limiting sense. Rather, other variations and modifications may be made without departing from the scope and spirit of the present disclosure as defined in the appended claims.

What is claimed is:

1. A system for automatically configuring a cutterbar of an agricultural header comprising:

a frame;

a first float arm;

a second float arm, each of the first float arm and second float arm configured to move relative to the frame and including:

a first end; and a second end opposite the first end, the first float arm and the second float arm pivotably connected at the first ends thereof, the first float arm pivotable about a first pivot axis located at the first end thereof, and the second float arm pivotable about a second pivot axis located at the first end thereof;

a gauge wheel moveable between an extended position and a retracted position; and a cutterbar coupled to the second end of each of the first float arm and the second float arm and movable with the first float arm and the second float arm, the cutterbar movable between a flexible configuration in which the first float arm and the second float arm are independently movable relative to each other and a rigid configuration in which the first float arm and the second float arm are in abutting contact with the frame, the cutterbar movable into the rigid configuration in response to a pressurized fluid used to move the gauge wheel into the extended position or the cutterbar movable into the flexible configuration in response to the pressurized fluid used to move the gauge wheel into the retracted position, wherein, in the rigid configuration, a portion of each of the first float arm and the second float arm offset from the first end abuts a portion of the frame.

2. The system of claim 1, wherein the pressurized fluid causes simultaneous extension of the gauge wheels and movement of the cutterbar into the rigid configuration.

3. The system of claim 1, wherein the pressurized fluid causes simultaneous retraction of the gauge wheels and movement of the cutterbar into the flexible configuration.

4. The system of claim 1, further comprising a first actuator coupled to the gauge wheel and actuatable in response to the pressurized fluid to move the gauge wheel between the extended position and the retracted position.

5. The system of claim 4, further comprising a second actuator coupled to the cutterbar that is actuatable in response to the pressurized fluid to move the cutterbar between the flexible configuration and the rigid configuration.

6. The system of claim 5, wherein the first actuator is a first hydraulic cylinder and wherein the second actuator is a second hydraulic cylinder.

7. The system of claim 6, further comprising a hydraulic circuit in fluid communication with the first hydraulic cylinder and the second hydraulic cylinder.

8. The system of claim 7, wherein the hydraulic circuit comprises:

a first line extending to a first end of the first hydraulic cylinder;

a second line extending to a second end of the first hydraulic cylinder;

a third line extending from the first line to a first end of the second hydraulic cylinder; and a valve disposed in the third line and moveable in response to the pressurized fluid in the second line.

9. The system of claim 8, wherein the first hydraulic cylinder and the second hydraulic cylinder are extended in response to introduction of the pressurized fluid into the first line, wherein the gauge wheel is moved into the extended position in response to extension of the first hydraulic cylinder, and wherein the cutterbar is moved into the rigid configuration in response to extension of the second hydraulic cylinder.

10. The system of claim 8, wherein the first hydraulic cylinder is retracted in response the pressurized fluid in the second line, wherein the valve is actuated in response to the pressurized fluid in the second line, and wherein the second hydraulic cylinder is retracted in response to actuation of the valve.

11. The system of claim 8, wherein the valve is a pilot pressure valve, and further comprising a pressure pilot line extending from the second line to the pilot pressure valve, wherein the pressure pilot line communicates pressure of the pressurized fluid to cause actuation of the pilot pressure valve when the pressurized fluid reaches a selected pressure.

12. The system of claim 8, further comprising a pressure sensor that measures the fluid pressure within the second line, and wherein the pressure sensor sends a signal to the valve to actuate the valve when the fluid pressure sensed by the sensor reaches a selected pressure.

13. The system of claim 7, wherein the second hydraulic cylinder is a single acting hydraulic cylinder.

14. The system of claim 7, wherein the second hydraulic cylinder is a double acting hydraulic cylinder.

15. A method of automatically configuring a cutterbar of an agricultural header, the method comprising:

pressurizing a fluid; and one of moving a gauge wheel into an extended position and simultaneously moving a cutterbar into a rigid configuration in response to the pressurized fluid and moving the gauge wheel into a retracted position and simultaneously moving the cutterbar into a flexible configuration in response to the pressurized fluid, the cutterbar, in the rigid configuration, being maintained in an unbent condition and the cutterbar, in the flexible configuration, having a first portion and a second portion, laterally offset from the first portion, being configured to be displaceable relative to each other in response to engagement with ground topography, wherein moving the cutterbar into the rigid configuration includes actuating one or more float arms of the agricultural header into abutting contact with a frame of the agricultural header at a location of the one or more float arms offset from an end of the one or more float arms that is pivotably connected to the frame.

16. The method of claim 15, wherein moving the gauge wheel into the extended position and simultaneously moving the cutterbar into the rigid configuration in response to the pressurize fluid comprises:

actuating a first hydraulic cylinder to move the gauge wheel into the extended position in response to the pressurized fluid; and simultaneously actuating a second hydraulic cylinder to move the cutterbar into the rigid configuration in response to the pressurized fluid.

17. The method of claim 15, wherein moving the gauge wheel into the retracted position while simultaneously moving the cutterbar into the flexible configuration in response to the pressurized fluid comprises:

actuating a first hydraulic cylinder to move the gauge wheel into the retracted position in response to the pressurized fluid; and actuating a valve when the pressurized fluid reaches a selected pressure, wherein actuation of the valve causes actuation of a second hydraulic cylinder to move the cutterbar into the flexible configuration.

18. The method of claim 17, wherein the valve is a pilot pressure valve and wherein actuating the valve when the pressurized fluid reaches the selected pressure comprises:

transmitting the pressurized fluid to the pilot pressure valve via a pilot pressure line; and actuating the pilot pressure valve with the pressurized fluid when the pressurized fluid reaches the selected pressure.

19. The method of claim 17, wherein actuating the valve when the pressurized fluid reaches the selected pressure comprises:

sensing a pressure of the pressurized fluid with a pressure sensor; and actuating the valve when the sensed pressure of the pressurized fluid reaches the selected pressure.

* * * * *